(12) United States Patent
Li et al.

(10) Patent No.: US 11,914,109 B2
(45) Date of Patent: Feb. 27, 2024

(54) CAMERA LENS GROUP INCLUDING SIX LENSES OF ++−+−−, ++−++−, ++−+−+ OR −+−++− REFRACTIVE POWERS

(71) Applicant: Zhejiang Sunny Optics Co., Ltd, Yuyao (CN)

(72) Inventors: Long Li, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 483 days.

(21) Appl. No.: 17/193,456

(22) Filed: Mar. 5, 2021

(65) Prior Publication Data

US 2022/0066171 A1 Mar. 3, 2022

(30) Foreign Application Priority Data

Sep. 1, 2020 (CN) .......................... 202010905205.X

(51) Int. Cl.
*G02B 13/00* (2006.01)
*G02B 9/62* (2006.01)
(52) U.S. Cl.
CPC ........... *G02B 13/0045* (2013.01); *G02B 9/62* (2013.01)
(58) Field of Classification Search
CPC .............................. G02B 13/0045; G02B 9/62
See application file for complete search history.

(56) References Cited

U.S. PATENT DOCUMENTS

2018/0356614 A1\* 12/2018 Hsueh .................. G02B 13/001
2020/0057232 A1    2/2020 Chang et al.

FOREIGN PATENT DOCUMENTS

| CN | 104375259 A | 2/2015 |
| CN | 104730687 A | 6/2015 |
| CN | 104730691 A | 6/2015 |
| CN | 105652412 A | 6/2016 |
| CN | 108333722 A | 7/2018 |
| CN | 105408806 B | 2/2019 |

OTHER PUBLICATIONS

India First Examination Report for Application No. 202114011156, dated Mar. 21, 2022, 5 pages.

\* cited by examiner

*Primary Examiner* — Wen Huang
(74) *Attorney, Agent, or Firm* — Barnes & Thornburg LLP

(57) ABSTRACT

The present disclosure discloses a camera lens group including, sequentially from an object side to an image side along an optical axis, a first lens having refractive power, a convex object-side surface and a concave image-side surface; a second lens having positive refractive power, a convex object-side surface and a concave image-side surface; a third lens having negative refractive power, a concave object-side surface and a concave image-side surface; a fourth lens having positive refractive power, a convex object-side surface and a concave image-side surface; a fifth lens having refractive power; and a sixth lens having refractive power, a convex object-side surface and a concave image-side surface. An F number Fno of the camera lens group satisfies: Fno≤1.45.

12 Claims, 11 Drawing Sheets

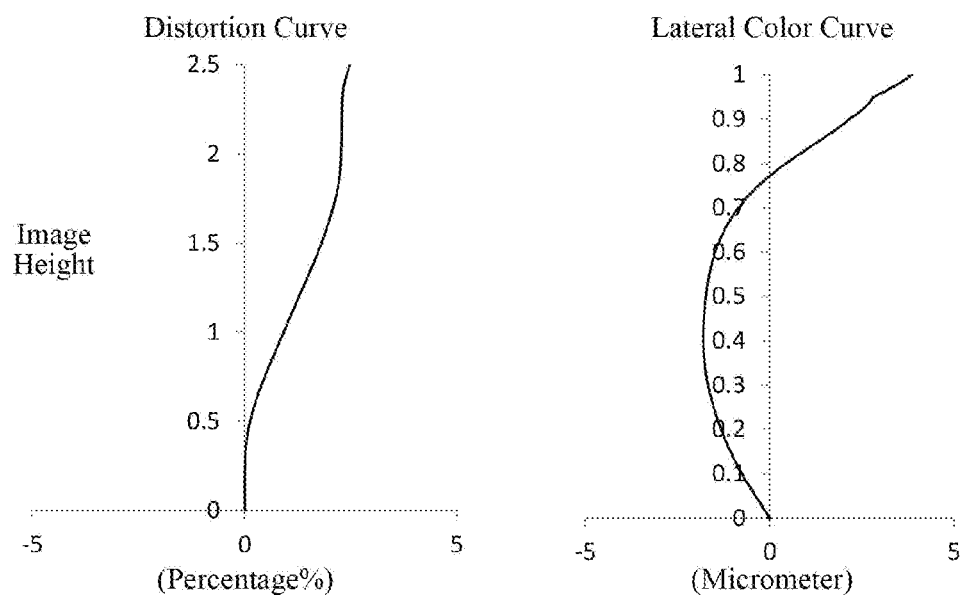
Fig. 2C
Fig. 2D
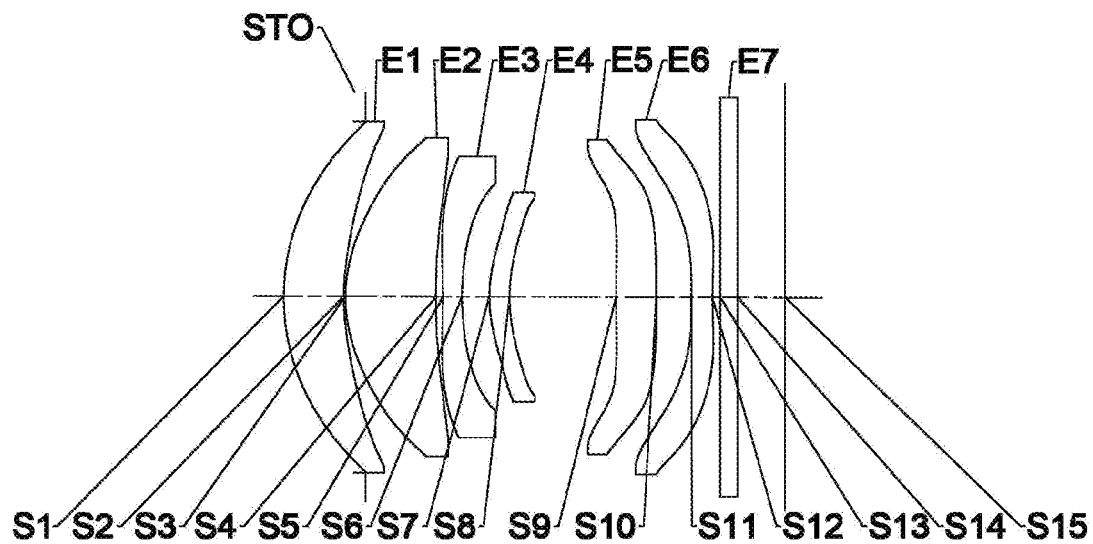
Fig. 3

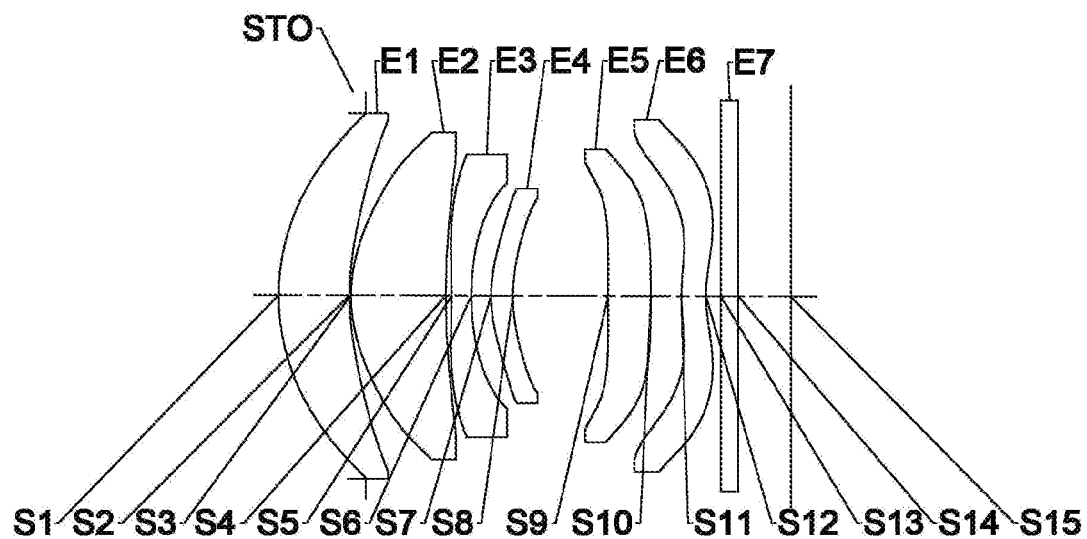
Fig. 5
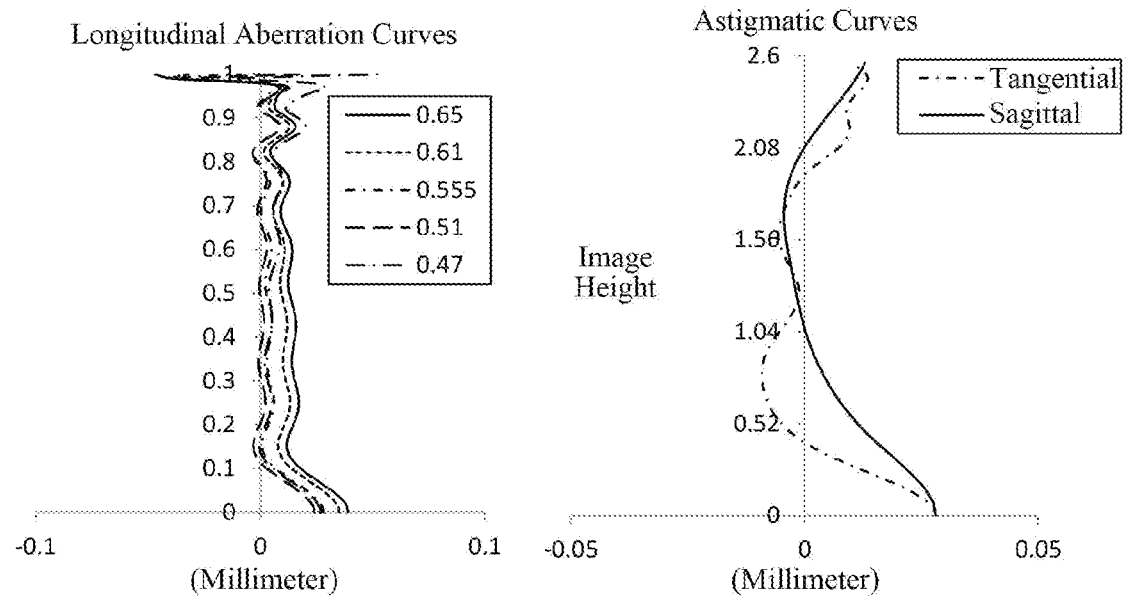
Fig. 6A
Fig. 6B

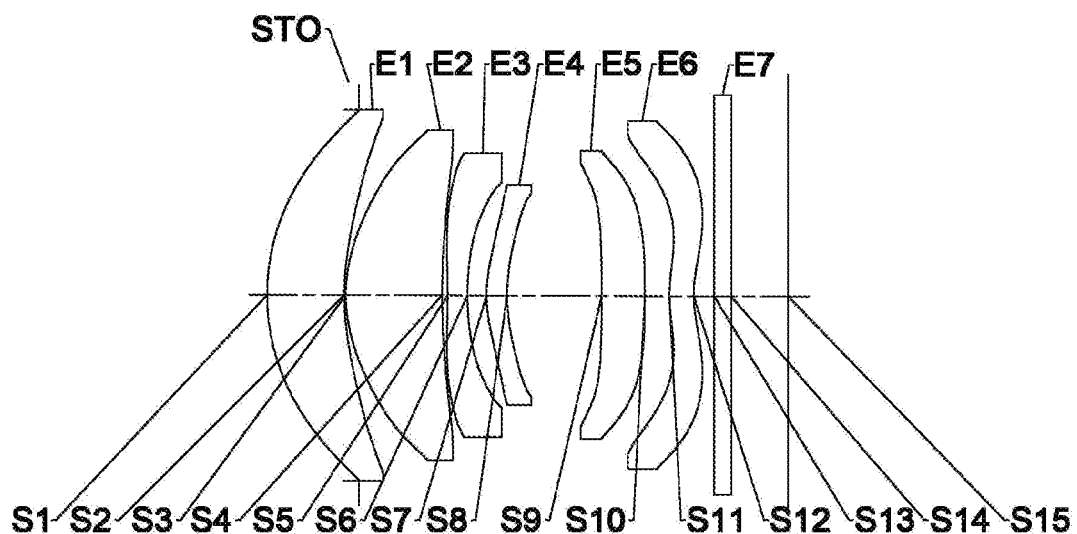
Fig. 9
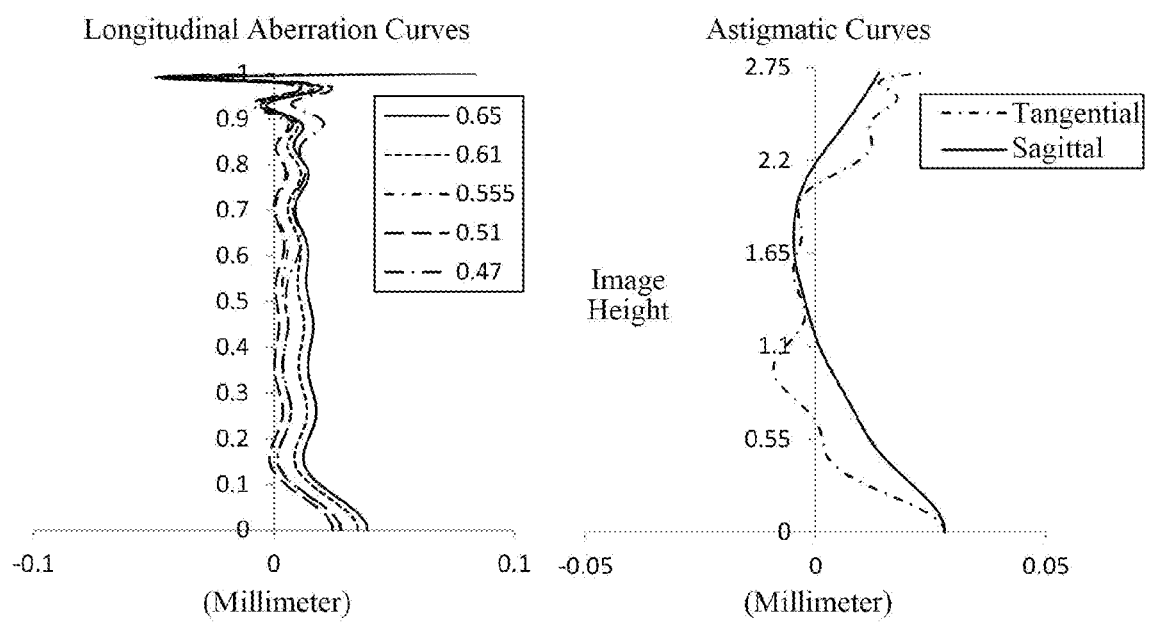
Fig. 10A
Fig. 10B

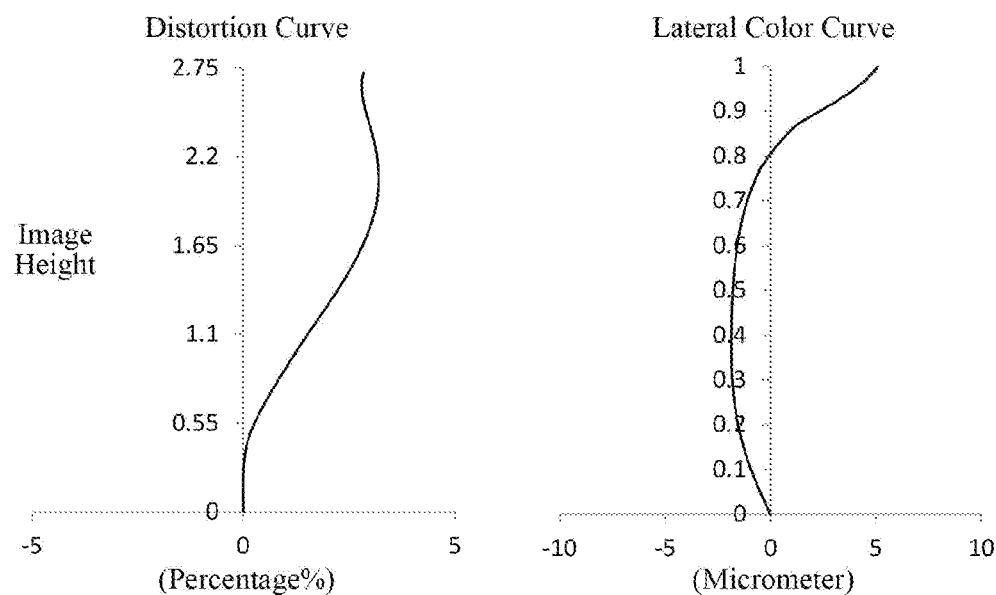
Fig. 10C
Fig. 10D
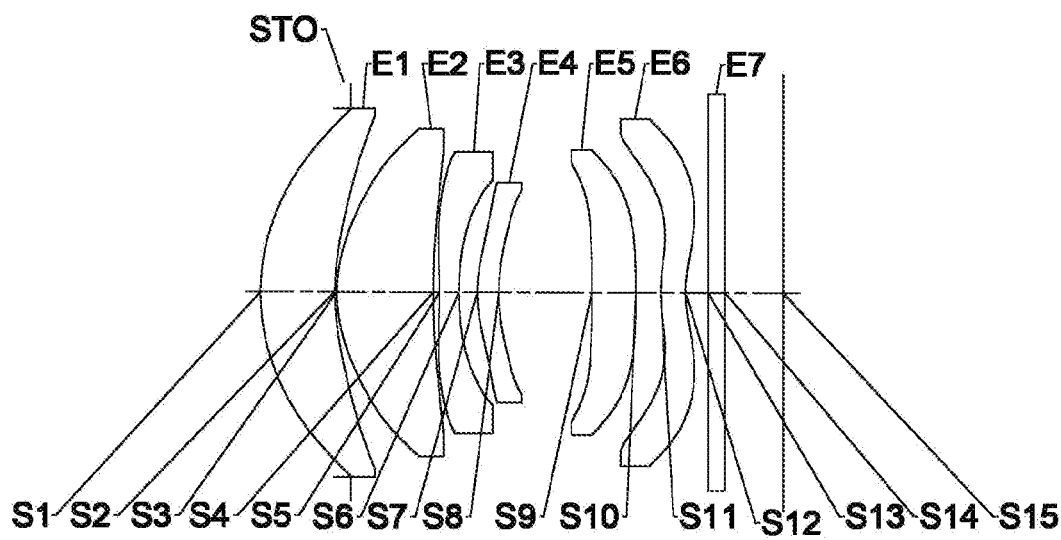
Fig. 11

CAMERA LENS GROUP INCLUDING SIX LENSES OF ++−+−−, ++−++−, ++−+−+ OR −+−++− REFRACTIVE POWERS

CROSS-REFERENCE TO RELATED APPLICATION

This application claims benefit of priority to Chinese Patent Application No. 202010905205.X filed on Sep. 1, 2020 before the China National Intellectual Property Administration, the entire disclosure of which is incorporated herein by reference in its entity.

TECHNICAL FIELD

The present disclosure relates to the field of optical elements, and specifically, relates to a camera lens group.

BACKGROUND

Currently, the market for portable electronic products, such as mobile phones, has higher and higher requirements on shooting quality. As a basic requirement, each mobile phone will be equipped with at least one camera with large aperture. The larger the aperture of the camera is, the more light passing through the camera per unit time will be, and the higher the clarity of the image will be.

Generally, the larger the aperture of the camera is, the smaller F number will be. However, as the F-number gradually decreases, especially when the F number is in the range of 1.2 to 1.5, the size of the front few lenses in the camera lens group will become very large and the sensitive thereof will become very high, resulting in the mass production capacity of the conventional processing and assembly cannot meet the demand for mass production in actual production.

SUMMARY

In one aspect, the present disclosure provides a camera lens group which includes, sequentially from an object side to an image side along an optical axis, a first lens having refractive power, a convex object-side surface and a concave image-side surface; a second lens having positive refractive power, a convex object-side surface and a concave image-side surface; a third lens having negative refractive power, a concave object-side surface and a concave image-side surface; a fourth lens having positive refractive power, a convex object-side surface and a concave image-side surface; a fifth lens having refractive power; and a sixth lens having refractive power, a convex object-side surface and a concave image-side surface. An F number Fno of the camera lens group may satisfy: Fno≤1.45.

In one embodiment, at least one of the object-side surface of the first lens to the image-side surface of the sixth lens is aspheric.

In one embodiment, a combined focal length f23 of the second lens and the third lens and a total effective focal length f of the camera lens group may satisfy: 1.00<f23/f<3.50.

In one embodiment, an effective focal length f4 of the fourth lens and a radius of curvature R12 of the image-side surface of the sixth lens may satisfy: 2.00<f4/R12<8.00.

In one embodiment, a combined focal length f45 of the fourth lens and the fifth lens and a distance BFL from the image-side surface of the sixth lens to an imaging plane of the camera lens group along the optical axis may satisfy: 7.00<f45/BFL<11.00.

In one embodiment, a radius of curvature R3 of the object-side surface of the second lens and a radius of curvature R4 of the image-side surface of the second lens may satisfy: 7.00<R4/R3<9.00.

In one embodiment, a radius of curvature R7 of the object-side surface of the fourth lens and a radius of curvature R8 of the image-side surface of the fourth lens may satisfy: 7.00<(R7+R8)/(R8−R7)<10.00.

In one embodiment, a center thickness CT2 of the second lens along the optical axis and a spaced interval T23 between the second lens and the third lens along the optical axis may satisfy: 11.00<CT2/T23<17.00.

In one embodiment, a center thickness CT6 of the sixth lens along the optical axis and a spaced interval T45 between the fourth lens and the fifth lens along the optical axis may satisfy: 3.00<T45/CT6<6.00.

In one embodiment, a distance SAG11 along the optical axis from an intersection of the object-side surface of the first lens and the optical axis to a vertex of an effective radius of the object-side surface of the first lens and a distance SAG12 along the optical axis from an intersection of the image-side surface of the first lens and the optical axis to a vertex of an effective radius of the image-side surface of the first lens may satisfy: 2.00<(SAG11+SAG12)/(SAG11−SAG12)<4.00.

In one embodiment, an edge thickness ET3 of the third lens and an edge thickness ET4 of the fourth lens may satisfy: 3.00<(ET3+ET4)/(ET3−ET4)<5.00.

In one embodiment, a maximum effective radius DT11 of the object-side surface of the first lens and a maximum effective radius DT12 of the image-side surface of the first lens may satisfy: 47.00<(DT11+DT12)/(DT11−DT12)<61.00.

In one embodiment, the camera lens group further includes a stop disposed between the object side and the first lens.

In another aspect, the present disclosure provides a camera lens group which includes, sequentially from an object side to an image side along an optical axis, a first lens having refractive power, a convex object-side surface and a concave image-side surface; a second lens having positive refractive power, a convex object-side surface and a concave image-side surface; a third lens having negative refractive power, a concave object-side surface and a concave image-side surface; a fourth lens having positive refractive power, a convex object-side surface and a concave image-side surface; a fifth lens having refractive power; and a sixth lens having refractive power, a convex object-side surface and a concave image-side surface. A maximum effective radius DT11 of the object-side surface of the first lens and a maximum effective radius DT12 of the image-side surface of the first lens may satisfy: 47.00<(DT11+DT12)/(DT11−DT12)<61.00.

The present disclosure provides a camera lens group applicable to portable electronic products and having at least one beneficial effect such as ultra-small F-number, telephoto, and good image quality by reasonably assigning refractive power and optimizing optical parameters.

BRIEF DESCRIPTION OF THE DRAWINGS

Other features, objects, and advantages of the present disclosure will become more apparent by reading the detailed description of the non-limiting examples with reference to the accompanying drawings:

FIGS. 2A to 2D illustrate longitudinal aberration curves, astigmatic curves, a distortion curve, and a lateral color curve of the camera lens group of the example 1, respectively;

FIG. 3 illustrates a schematic structural view of a camera lens group according to example 2 of the present disclosure;

FIG. 5 illustrates a schematic structural view of a camera lens group according to example 3 of the present disclosure;

FIGS. 6A to 6D illustrate longitudinal aberration curves, astigmatic curves, a distortion curve, and a lateral color curve of the camera lens group of the example 3, respectively;

FIG. 9 illustrates a schematic structural view of a camera lens group according to example 5 of the present disclosure;

FIGS. 10A to 10D illustrate longitudinal aberration curves, astigmatic curves, a distortion curve, and a lateral color curve of the camera lens group of the example 5, respectively;

FIG. 11 illustrates a schematic structural view of a camera lens group according to example 6 of the present disclosure;

DETAILED DESCRIPTION OF EMBODIMENTS

Figure 1:
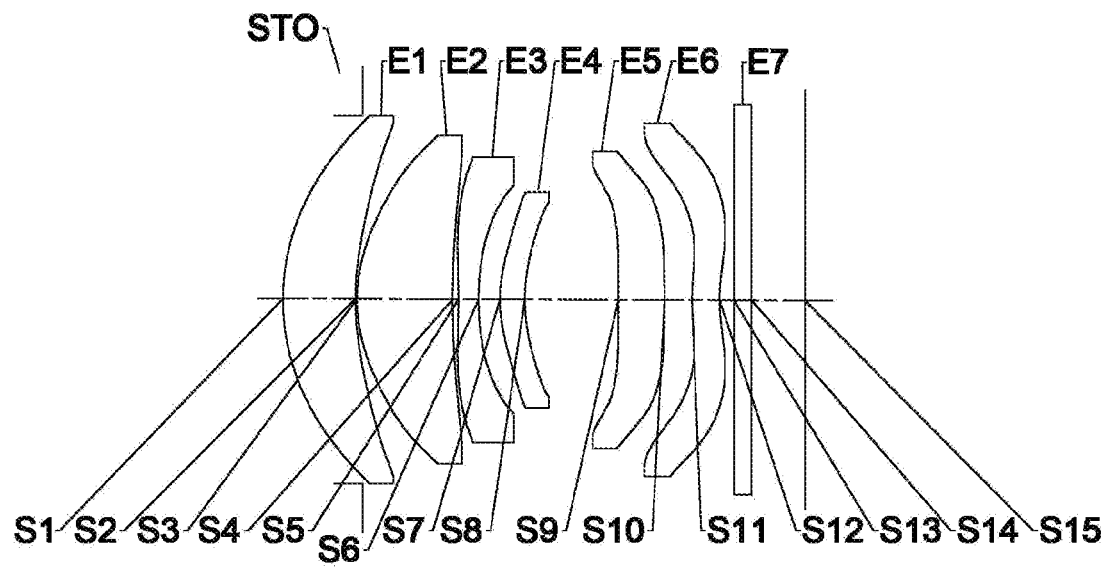
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include six lenses having refractive power, which are a first lens, a second lens, a third lens, a fourth lens, a fifth lens and a sixth lens. The six lenses are arranged sequentially from an object side to an image side along an optical axis. Among the first lens to the sixth lens, there may be a spaced interval between each two adjacent lenses.

In an exemplary embodiment, the first lens may have positive or negative refractive power, an object-side surface thereof may be convex, and an image-side surface thereof may be concave; the second lens may have positive refractive power, an object-side surface thereof may be convex, and an image-side surface thereof may be concave; the third lens may have negative refractive power, an object-side surface thereof may be concave, and an image-side surface thereof may be a concave surface; the fourth lens may have positive refractive power, an object-side surface thereof may be a convex surface, and an image-side surface thereof may be concave; the fifth lens may have positive or negative refractive power; and the sixth lens may have positive or negative refractive power, an object-side surface thereof may be convex, and an image-side surface thereof may be concave.

In an exemplary embodiment, by configuring the first lens to be a convex-concave lens, configuring the second lens to be a convex-concave lens, configuring the third lens to be a concave-concave lens, configuring the fourth lens to be a convex-concave lens, and configuring the sixth lens to have a concave image-side surface, it is beneficial to reduce the F number of the system, and make the lens have a good convergence effect on the center light, thereby improving the image quality of the camera lens group.

In an exemplary embodiment, the camera lens group according to the present disclosure may satisfy: Fno≤1.45, where Fno is an F number of the camera lens group. Satisfying Fno≤1.45 is beneficial to increasing the amount of light per unit time, so that higher imaging definition may be achieved under the condition of small pixel pitch.

In an exemplary embodiment, the camera lens group according to the present disclosure may satisfy: 1.00<f23/f<3.50, where f23 is a combined focal length of the second lens and the third lens, and f is a total effective focal length of the camera lens group. More specifically, f23 and f may further satisfy: 1.50<f23/f<3.20. When 1.00<f23/f<3.50 is satisfied, the aberration correction ability of the camera lens group may be improved, and the refractive power may be prevented from being too concentrated on the second lens and the third lens, which is beneficial to reducing the sensitivity of the second lens and the third lens.

In an exemplary embodiment, the camera lens group according to the present disclosure may satisfy: 2.00<f4/R12<8.00, where f4 is an effective focal length of the fourth lens, and R12 is a radius of curvature of the image-side surface of the sixth lens. More specifically, f4 and R12 may further satisfy: 2.60<f4/R12<7.60. Satisfying 2.00<f4/R12<8.00 is beneficial to improving the convergence ability of the lens group to the center light. At the same time, it is beneficial to increase the size of the imaging plane.

In an exemplary embodiment, the camera lens group according to the present disclosure may satisfy: 7.00<f45/BFL<11.00, where f45 is a combined focal length of the fourth lens and the fifth lens, and BFL is a distance from the image-side surface of the sixth lens to an imaging plane of the camera lens group along the optical axis. More specifically, f45 and BFL may further satisfy: 7.50<f45/BFL<11.00. When 7.00<f45/BFL<11.00 is satisfied, the convergence ability of the lens group to the center light may be improved, the size of the imaging plane may be increased, and problems such as difficulty in focusing subsequent lenses due to too small back focus BFL may also be avoided.

In an exemplary embodiment, the camera lens group according to the present disclosure may satisfy: 7.00<R4/R3<9.00, where R3 is a radius of curvature of the object-side surface of the second lens, and R4 is a radius of curvature of the image-side surface of the second lens. More specifically, R4 and R3 may further satisfy: 7.10<R4/R3<9.00. Satisfying 7.00<R4/R3<9.00 may improve the aberration correction ability of the camera lens group, and may reduce the sensitivity of the second lens, which is beneficial to subsequent processing.

In an exemplary embodiment, the camera lens group according to the present disclosure may satisfy: 7.00<(R7+R8)/(R8−R7)<10.00, where R7 is a radius of curvature of the object-side surface of the fourth lens, and R8 is a radius of curvature of the image-side surface of the fourth lens. More specifically, R7 and R8 may further satisfy: 7.30<(R7+R8)/(R8−R7)<9.90. When 7.00<(R7+R8)/(R8−R7)<10.00 is satisfied, the aberration correction capability of the camera lens group may be improved, and problems such as processing difficulties caused by the increase in sensitivity of the fourth lens may be avoided.

In an exemplary embodiment, the camera lens group according to the present disclosure may satisfy: 11.00<CT2/T23<17.00, where CT2 is a center thickness of the second lens along the optical axis, and T23 is a spaced interval between the second lens and the third lens along the optical axis. More specifically, CT2 and T23 may further satisfy: 11.70<CT2/T23<17.00. When 11.00<CT2/T23<17.00 is satisfied, it is beneficial to correct the optical distortion of the camera lens group. At the same time, it is beneficial to shorten the total length of the camera lens group.

In an exemplary embodiment, the camera lens group according to the present disclosure may satisfy: 3.00<T45/CT6<6.00, where CT6 is a center thickness of the sixth lens along the optical axis, and T45 is a spaced interval between the fourth lens and the fifth lens along the optical axis. More specifically, T45 and CT6 may further satisfy: 3.00<T45/CT6<5.10. When 3.00<T45/CT6<6.00 is satisfied, problems such as difficulty in forming the model due to the sixth lens being too thin may be avoided, and problems such as difficulty in design the lens barrel caused by the excessively large interval between the fourth lens and the fifth lens may be avoided.

In an exemplary embodiment, the camera lens group according to the present disclosure may satisfy: 2.00<(SAG11+SAG12)/(SAG11−SAG12)<4.00, where SAG11 is a distance along the optical axis from an intersection of the object-side surface of the first lens and the optical axis to a vertex of an effective radius of the object-side surface of the first lens, and SAG12 is a distance along the optical axis from an intersection of the image-side surface of the first lens and the optical axis to a vertex of an effective radius of the image-side surface of the first lens. More specifically, SAG11 and SAG12 may further satisfy: 2.30<(SAG11+SAG12)/(SAG11−SAG12)<3.30. When 2.00<(SAG11+SAG12)/(SAG11−SAG12)<4.00 is satisfied, it is beneficial to use the first lens to improve the image quality of the camera lens group, while avoiding problems such as processing difficulties caused by the increased sensitivity of the first lens.

In an exemplary embodiment, the camera lens group according to the present disclosure may satisfy: 3.00<(ET3+ET4)/(ET3−ET4)<5.00, where ET3 is an edge thickness of the third lens, and ET4 is an edge thickness of the fourth lens. Satisfying 3.00<(ET3+ET4)/(ET3−ET4)<5.00 is beneficial to improving the manufacturability of the third lens and the fourth lens, while also enabling the camera lens group to have better image quality.

In an exemplary embodiment, the camera lens group according to the present disclosure may satisfy: 47.00<(DT11+DT12)/(DT11−DT12)<61.00, where DT11 is a maximum effective radius of the object-side surface of the first lens, and DT12 is a maximum effective radius of the image-side surface of the first lens. More specifically, DT11 and DT12 may further satisfy: 47.60<(DT11+DT12)/(DT11−DT12)<60.50. Satisfying 47.00<(DT11+DT12)/(DT11−DT12)<61.00 is beneficial to reducing the F number of the camera lens group, so that the camera lens group has a higher image quality.

In an exemplary embodiment, the camera lens group according to the present disclosure further includes a stop disposed between the object side and the first lens. Optionally, the above camera lens group may further include an optical filter for correcting the color deviation and/or a protective glass for protecting the photosensitive element located on an imaging plane.

The present disclosure proposes a camera lens group having the characteristics of miniaturization, ultra-small F number, telephoto, high resolution, and high image quality and the like. The camera lens group according to the above embodiments of the present disclosure may employ a plurality of lenses, such as six lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the camera lens group is more advantageous for production processing.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking six lenses as an example, the camera lens group is not limited to include six lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.9539 | | | | |
| S1 | Aspheric | 2.7120 | 0.8650 | 1.55 | 56.1 | 26.90 | −0.1260 |
| S2 | Aspheric | 2.9515 | 0.0200 | | | | 0.0010 |
| S3 | Aspheric | 1.7771 | 1.1460 | 1.55 | 56.1 | 3.56 | −0.9568 |
| S4 | Aspheric | 15.9443 | 0.0700 | | | | −85.9696 |
| S5 | Aspheric | −9.4230 | 0.2401 | 1.67 | 19.2 | −3.31 | −4.5862 |
| S6 | Aspheric | 2.9720 | 0.2558 | | | | 0.4364 |
| S7 | Aspheric | 1.6751 | 0.2986 | 1.67 | 19.2 | 9.55 | 0.0099 |
| S8 | Aspheric | 2.0979 | 1.1213 | | | | 0.7610 |
| S9 | Aspheric | 157.5473 | 0.5526 | 1.67 | 20.4 | −1528.39 | 99.0000 |
| S10 | Aspheric | 136.2518 | 0.3272 | | | | 99.0000 |
| S11 | Aspheric | 2.5871 | 0.3300 | 1.55 | 56.1 | −21.32 | −14.3018 |
| S12 | Aspheric | 2.0213 | 0.1743 | | | | −5.4144 |
| S13 | Spherical | Infinite | 0.2100 | 1.52 | 64.2 | | |
| S14 | Spherical | Infinite | 0.6390 | | | | |
| S15 | Spherical | Infinite | | | | | |

In this example, a total effective focal length f of the camera lens group is 5.88 mm, a total length TTL of the camera lens group (that is, a distance along the optical axis from the object-side surface S1 of the first lens E1 to the imaging plane S15 of the camera lens group) is 6.25 mm, half of a diagonal length ImgH of an effective pixel area on the imaging plane S15 of the camera lens group is 2.50 mm, half of a maximum field-of-view Semi-FOV of the camera lens group is 22.7°, and an F number Fno of the camera lens group is 1.33.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2-1 and Table 2-2 below show high-order coefficients A4, A6, A8, A10, A12, A14, A16, A18, A20, A22, A24, A26, A28 and A30 applicable to each aspheric surface S1 to S12 in example 1.

Figures 2A, 2B:
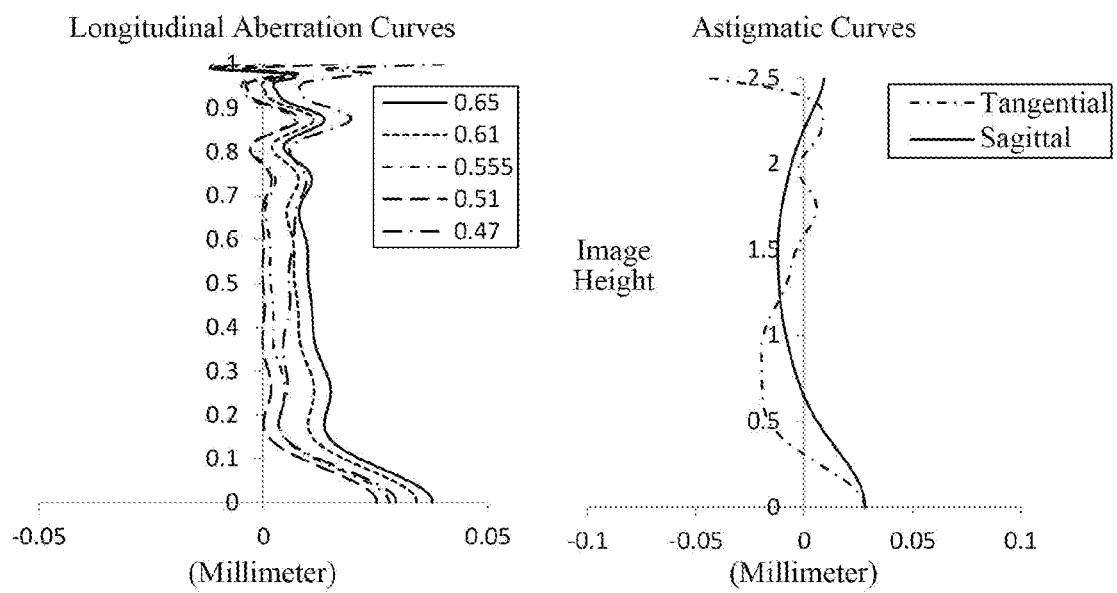

FIG. 2A illustrates longitudinal aberration curves of the camera lens group according to example 1, representing the deviations of focal points converged by light of different wavelengths after passing through the lens group. FIG. 2B illustrates astigmatic curves of the camera lens group according to example 1, representing the curvatures of a tangential plane and the curvatures of a sagittal plane. FIG. 2C illustrates a distortion curve of the camera lens group according to example 1, representing the amounts of distortion corresponding to different image heights. FIG. 2D illustrates a lateral color curve of the camera lens group according to example 1, representing the deviations of different image heights on an imaging plane after light passes through the lens group. It can be seen from FIG. 2A to FIG. 2D that the camera lens group provided in example 1 may achieve good image quality.

Example 2

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

TABLE 2-1

| Surface number | A4 | A6 | A8 | A10 | A12 | A14 | A16 |
|---|---|---|---|---|---|---|---|
| S1 | 2.3461E−03 | −1.2016E−03 | −2.7936E−03 | 1.1772E−02 | −2.0212E−02 | 2.0691E−02 | −1.4046E−02 |
| S2 | −1.3222E−01 | 2.8834E−01 | −5.7087E−01 | 8.2522E−01 | −8.5364E−01 | 6.3619E−01 | −3.4510E−01 |
| S3 | −1.1929E−01 | 2.9847E−01 | −6.1609E−01 | 9.1593E−01 | −9.5952E−01 | 7.0549E−01 | −3.6028E−01 |
| S4 | 6.4109E−02 | −1.0723E−01 | −2.2449E−01 | 1.5246E+00 | −3.4675E+00 | 4.5539E+00 | −3.9206E+00 |
| S5 | 7.0041E−02 | 5.5864E−03 | −3.5922E−01 | 1.6440E+00 | −3.7864E+00 | 5.3985E+00 | −5.2494E+00 |
| S6 | −1.0711E−01 | 5.4507E−01 | −2.6219E+00 | 1.1583E+01 | −3.7181E+01 | 8.4468E+01 | −1.3741E+02 |
| S7 | −1.5887E−01 | −2.4980E−01 | 3.2122E+00 | −1.8857E+01 | 7.1577E+01 | −1.8713E+02 | 3.4651E+02 |
| S8 | −9.7812E−02 | 3.7958E−01 | −4.2704E+00 | 3.1216E+01 | −1.5089E+02 | 4.9827E+02 | −1.1510E+03 |
| S9 | −4.7713E−02 | 3.6268E−03 | 1.4205E−01 | −6.6169E−01 | 1.4946E+00 | −2.0800E+00 | 1.8668E+00 |
| S10 | −1.7785E−01 | 4.1756E−01 | −1.0906E+00 | 2.1635E+00 | −3.1100E+00 | 3.1983E+00 | −2.3481E+00 |
| S11 | −3.0872E−01 | 2.3983E−01 | −1.8270E−01 | 1.3010E−01 | −5.7412E−02 | −1.8140E−02 | 5.2331E−02 |
| S12 | −2.4406E−01 | 9.9245E−02 | 1.8871E−01 | −5.5416E−01 | 7.7590E−01 | −7.1250E−01 | 4.6003E−01 |

TABLE 2-2

| Surface number | A18 | A20 | A22 | A24 | A26 | A28 | A30 |
|---|---|---|---|---|---|---|---|
| S1 | 6.6010E−03 | −2.1849E−03 | 5.0911E−04 | −8.1922E−05 | 8.6837E−06 | −5.4666E−07 | 1.5506E−08 |
| S2 | 1.3702E−01 | −3.9720E−02 | 8.2966E−03 | −1.2135E−03 | 1.1772E−04 | −6.7891E−06 | 1.7585E−07 |
| S3 | 1.2316E−01 | −2.5057E−02 | 1.5135E−03 | 6.3274E−04 | −1.8564E−04 | 2.1093E−05 | −9.2580E−07 |
| S4 | 2.3378E+00 | −9.8998E−01 | 2.9918E−01 | −6.3497E−02 | 9.0402E−03 | −7.7805E−04 | 3.0657E−05 |
| S5 | 3.6627E+00 | −1.8738E+00 | 7.0103E−01 | −1.8671E−01 | 3.3440E−02 | −3.5964E−03 | 1.7490E−04 |
| S6 | 1.6138E+02 | −1.3673E+02 | 8.2635E+01 | −3.4691E+01 | 9.6028E+00 | −1.5750E+00 | 1.1589E−01 |
| S7 | −4.6070E+02 | 4.4091E+02 | −3.0088E+02 | 1.4272E+02 | −4.4681E+01 | 8.2968E+00 | −6.9170E−01 |
| S8 | 1.8867E+03 | −2.2037E+03 | 1.8197E+03 | −1.0370E+03 | 3.8780E+02 | −8.5593E+01 | 8.4473E+00 |
| S9 | −1.0543E+00 | 3.2097E−01 | −4.3834E−03 | −3.6869E−02 | 1.4260E−02 | −2.4058E−03 | 1.6042E−04 |
| S10 | 1.2194E+00 | −4.3648E−01 | 1.0121E−01 | −1.2806E−02 | 2.2462E−04 | 1.4919E−04 | −1.3544E−05 |
| S11 | −4.2502E−02 | 2.0164E−02 | −6.1779E−03 | 1.2390E−03 | −1.5773E−04 | 1.1625E−05 | −3.8064E−07 |
| S12 | −2.1396E−01 | 7.2068E−02 | −1.7422E−02 | 2.9459E−03 | −3.3070E−04 | 2.2137E−05 | −6.6872E−07 |

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 5.89 mm, a total length TTL of the camera lens group is 6.14 mm, half of a diagonal length ImgH of an effective pixel area on the imaging plane S15 of the camera lens group is 2.55 mm, half of a maximum field-of-view Semi-FOV of the camera lens group is 23.40, and an F number Fno of the camera lens group is 1.39.

Table 3 is a table illustrating basic parameters of the camera lens group of example 2, wherein the units for the radius of curvature, the thickness/distance and the focal length are millimeter (mm). Table 4-1 and Table 4-2 show high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Material Abbe number | Focal length | Conic coefficient |
| --- | --- | --- | --- | --- | --- | --- | --- |
| OBJ | Spherical | Infinite | Infinite | | | | |
| STO | Spherical | Infinite | −0.9902 | | | | |
| S1 | Aspheric | 2.6661 | 0.7249 | 1.55 | 56.1 | 40.98 | −0.0542 |
| S2 | Aspheric | 2.7362 | 0.0200 | | | | −0.0588 |
| S3 | Aspheric | 1.6868 | 1.0952 | 1.55 | 56.1 | 3.46 | −0.9816 |
| S4 | Aspheric | 12.2722 | 0.0881 | | | | −9.2085 |
| S5 | Aspheric | −8.7877 | 0.2300 | 1.67 | 19.2 | −3.56 | 0.9641 |
| S6 | Aspheric | 3.3563 | 0.4086 | | | | 0.0308 |
| S7 | Aspheric | 1.6390 | 0.2456 | 1.67 | 19.2 | 10.16 | 0.0172 |
| S8 | Aspheric | 2.0209 | 1.2904 | | | | 0.5149 |
| S9 | Aspheric | 18.3285 | 0.4844 | 1.67 | 20.4 | 20.49 | 37.9475 |
| S10 | Aspheric | −53.0013 | 0.4248 | | | | 21.1272 |
| S11 | Aspheric | 36.0706 | 0.2546 | 1.55 | 56.1 | −7.76 | −99.0000 |
| S12 | Aspheric | 3.7816 | 0.0950 | | | | −3.4769 |
| S13 | Spherical | Infinite | 0.2100 | 1.52 | 64.2 | | |
| S14 | Spherical | Infinite | 0.5726 | | | | |
| S15 | Spherical | Infinite | | | | | |

TABLE 4-1

| Surface number | A4 | A6 | A8 | A10 | A12 | A14 | A16 |
| --- | --- | --- | --- | --- | --- | --- | --- |
| S1 | 5.0148E−03 | −2.8864E−02 | 1.2028E−01 | −2.9062E−01 | 4.4366E−01 | −4.5407E−01 | 3.2283E−01 |
| S2 | −1.5485E−01 | 3.9235E−01 | −9.3366E−01 | 1.6077E+00 | −1.9484E+00 | 1.6785E+00 | −1.0422E+00 |
| S3 | −1.3204E−01 | 3.6507E−01 | −8.4751E−01 | 1.3892E+00 | −1.5561E+00 | 1.1841E+00 | −6.0167E−01 |
| S4 | 9.6411E−02 | −1.1678E−01 | −5.0275E−01 | 2.7804E+00 | −6.4793E+00 | 9.0601E+00 | −8.3971E+00 |
| S5 | 1.1491E−01 | −1.0229E−01 | −5.3188E−01 | 3.5018E+00 | −9.4836E+00 | 1.5437E+01 | −1.6842E+01 |
| S6 | −5.7038E−02 | 2.2306E−01 | −8.7449E−01 | 3.0938E+00 | −6.1962E+00 | 5.2954E+00 | 3.8085E+00 |
| S7 | −1.2364E−01 | −5.6441E−01 | 4.3527E+00 | −1.9517E+01 | 5.7466E+01 | −1.1583E+02 | 1.6313E+02 |
| S8 | −9.0978E−02 | 3.2587E−01 | −4.4232E+00 | 3.0587E+01 | −1.3123E+02 | 3.7699E+02 | −7.5322E+02 |
| S9 | −9.4833E−03 | −1.8991E−01 | 8.0676E−01 | −2.2703E+00 | 4.2965E+00 | −5.7086E+00 | 5.4316E+00 |
| S10 | −3.8573E−02 | −1.4962E−02 | 5.4932E−02 | −2.5726E−02 | −1.4879E−01 | 3.4783E−01 | −4.0178E−01 |
| S11 | −3.8586E−01 | 6.1327E−01 | −1.1052E+00 | 1.9123E+00 | −2.5443E+00 | 2.4464E+00 | −1.6982E+00 |
| S12 | −3.6973E−01 | 4.9924E−01 | −6.8639E−01 | 8.6996E−01 | −8.8324E−01 | 6.7472E−01 | −3.8257E−01 |

TABLE 4-2

| Surface number | A18 | A20 | A22 | A24 | A26 | A28 | A30 |
|---|---|---|---|---|---|---|---|
| S1 | −1.6262E−01 | 5.8421E−02 | −1.4863E−02 | 2.6152E−03 | −3.0251E−04 | 2.0687E−05 | −6.3344E−07 |
| S2 | 4.7040E−01 | −1.5425E−01 | 3.6322E−02 | −5.9761E−03 | 6.5138E−04 | −4.2209E−05 | 1.2295E−06 |
| S3 | 1.9082E−01 | −2.7731E−02 | −4.1256E−03 | 2.9278E−03 | −6.2964E−04 | 6.5947E−05 | −2.8233E−06 |
| S4 | 5.4020E+00 | −2.4639E+00 | 7.9876E−01 | −1.8082E−01 | 2.7273E−02 | −2.4689E−03 | 1.0161E−04 |
| S5 | 1.2916E+01 | −7.0926E+00 | 2.7827E+00 | −7.6243E−01 | 1.3856E−01 | −1.4999E−02 | 7.3134E−04 |
| S6 | −1.6119E+01 | 2.1164E+01 | −1.6128E+01 | 7.7694E+00 | −2.3385E+00 | 4.0267E−01 | −3.0331E−02 |
| S7 | −1.6131E+02 | 1.1061E+02 | −5.0623E+01 | 1.4085E+01 | −1.7608E+00 | −9.7534E−02 | 3.9054E−02 |
| S8 | 1.0675E+03 | −1.0796E+03 | 7.7334E+02 | −3.8294E+02 | 1.2454E+02 | −2.3908E+01 | 2.0502E+00 |
| S9 | −3.7298E+00 | 1.8444E+00 | −6.4831E−01 | 1.5758E−01 | −2.5129E−02 | 2.3622E−03 | −9.9146E−05 |
| S10 | 2.9540E−01 | −1.4756E−01 | 5.0817E−02 | −1.1885E−02 | 1.8009E−03 | −1.5923E−04 | 6.2262E−06 |
| S11 | 8.5449E−01 | −3.1074E−01 | 8.0626E−02 | −1.4524E−02 | 1.7236E−03 | −1.2106E−04 | 3.8107E−06 |
| S12 | 1.6053E−01 | −4.9524E−02 | 1.1061E−02 | −1.7357E−03 | 1.8107E−04 | −1.1248E−05 | 3.1404E−07 |

Figure 4A:
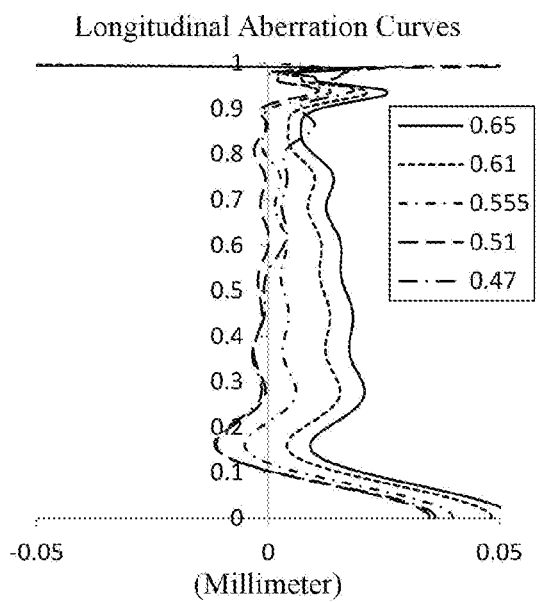
FIGS. 4A to 4D illustrate longitudinal aberration curves, astigmatic curves, a distortion curve, and a lateral color curve of the camera lens group of the example 2, respectively.
Figure 4B:
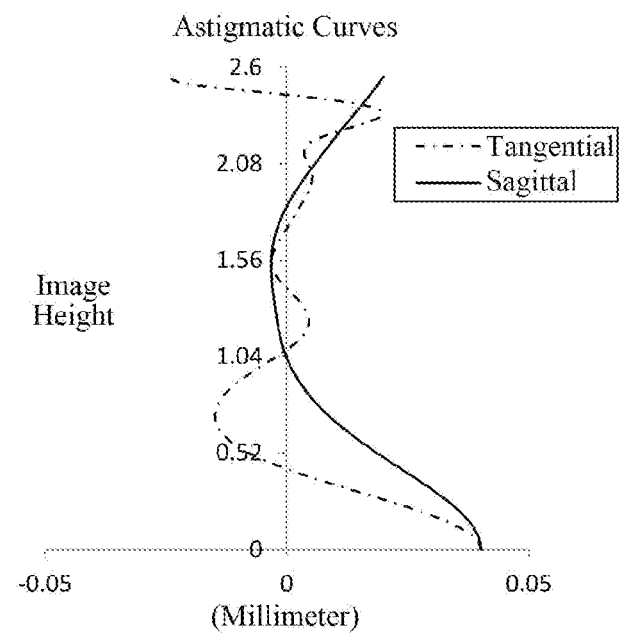
Figure 4C:
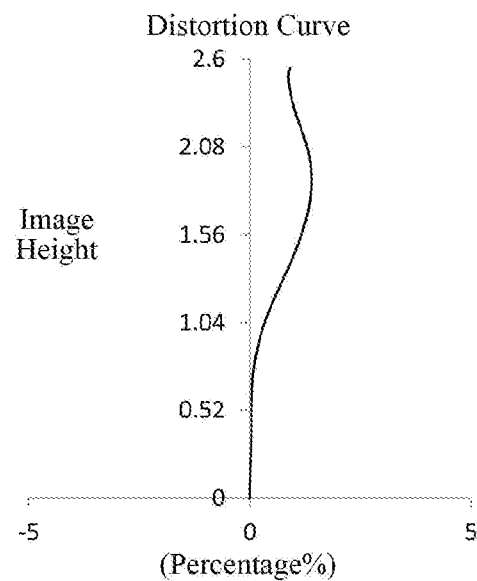
Figure 4D:
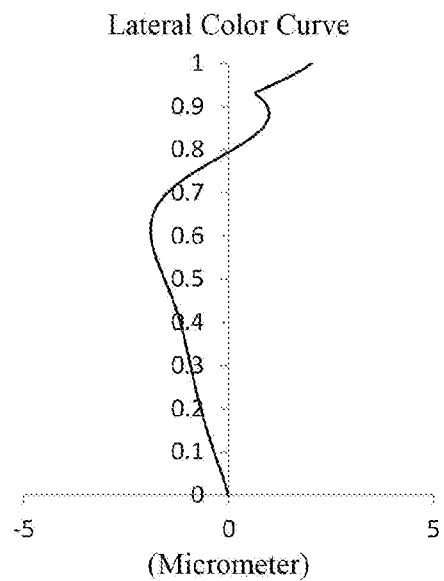

FIG. 4A illustrates longitudinal aberration curves of the camera lens group according to example 2, representing the deviations of focal points converged by light of different wavelengths after passing through the lens group. FIG. 4B illustrates astigmatic curves of the camera lens group according to example 2, representing the curvatures of a tangential plane and the curvatures of a sagittal plane. FIG. 4C illustrates a distortion curve of the camera lens group according to example 2, representing the amounts of distortion corresponding to different image heights. FIG. 4D illustrates a lateral color curve of the camera lens group according to example 2, representing the deviations of different image heights on an imaging plane after light passes through the lens group. It can be seen from FIG. 4A to FIG. 4D that the camera lens group provided in example 2 may achieve good image quality.

Example 3

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is concave. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 5.89 mm, a total length TTL of the camera lens group is 6.25 mm, half of a diagonal length ImgH of an effective pixel area on the imaging plane S15 of the camera lens group is 2.56 mm, half of a maximum field-of-view Semi-FOV of the camera lens group is 23.2°, and an F number Fno of the camera lens group is 1.32.

Table 5 is a table illustrating basic parameters of the camera lens group of example 3, wherein the units for the radius of curvature, the thickness/distance and the focal length are millimeter (mm). Table 6-1 and Table 6-2 show high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −1.0631 | | | | |
| S1 | Aspheric | 2.6945 | 0.8632 | 1.55 | 56.1 | 27.61 | −0.1218 |
| S2 | Aspheric | 2.9099 | 0.0200 | | | | 0.0059 |
| S3 | Aspheric | 1.7840 | 1.1576 | 1.55 | 56.1 | 3.63 | −0.9676 |
| S4 | Aspheric | 13.7669 | 0.0705 | | | | −79.0987 |
| S5 | Aspheric | −10.0645 | 0.2400 | 1.67 | 19.2 | −3.38 | −2.9214 |
| S6 | Aspheric | 2.9924 | 0.2394 | | | | 0.5477 |
| S7 | Aspheric | 1.6798 | 0.2675 | 1.67 | 19.2 | 9.66 | 0.0216 |
| S8 | Aspheric | 2.1142 | 1.1622 | | | | 0.7826 |
| S9 | Aspheric | 39.4460 | 0.5199 | 1.67 | 20.4 | 92.87 | 59.7816 |
| S10 | Aspheric | 108.1847 | 0.3723 | | | | 73.8854 |
| S11 | Aspheric | 2.2050 | 0.3000 | 1.55 | 56.1 | −17.52 | −15.9353 |

TABLE 5-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | 1.7057 | 0.1840 | | | | −6.1251 |
| S13 | Spherical | Infinite | 0.2100 | 1.52 | 64.2 | | |
| S14 | Spherical | Infinite | 0.6434 | | | | |
| S15 | Spherical | Infinite | | | | | |

TABLE 6-1

| Surface number | A4 | A6 | A8 | A10 | A12 | A14 | A16 |
|---|---|---|---|---|---|---|---|
| S1 | 4.7392E−03 | −2.0264E−02 | 7.1946E−02 | −1.5248E−01 | 2.0618E−01 | −1.8828E−01 | 1.2013E−01 |
| S2 | −1.5069E−01 | 4.1137E−01 | −9.4954E−01 | 1.5194E+00 | −1.7016E+00 | 1.3623E+00 | −7.9194E−01 |
| S3 | −1.3460E−01 | 3.9436E−01 | −8.7550E−01 | 1.2923E+00 | −1.2550E+00 | 7.7707E−01 | −2.6370E−01 |
| S4 | 2.1649E−02 | 1.3186E−01 | −7.0282E−01 | 1.8039E+00 | −2.9710E+00 | 3.3288E+00 | −2.6007E+00 |
| S5 | 2.1179E−02 | 3.7251E−01 | −1.5268E+00 | 3.9173E+00 | −6.9609E+00 | 8.7965E+00 | −8.0533E+00 |
| S6 | −1.1845E−01 | 5.8554E−01 | −1.9223E+00 | 5.2467E+00 | −1.1070E+01 | 1.7716E+01 | −2.1661E+01 |
| S7 | −1.7083E−01 | −1.8453E−01 | 2.8961E+00 | −1.6780E+01 | 6.0811E+01 | −1.5081E+02 | 2.6529E+02 |
| S8 | −9.2219E−02 | 2.9669E−01 | −3.0785E+00 | 2.0286E+01 | −8.7494E+01 | 2.5808E+02 | −5.3552E+02 |
| S9 | −5.6677E−02 | 7.7660E−02 | −2.0802E−01 | 4.8533E−01 | −9.8687E−01 | 1.5423E+00 | −1.7686E+00 |
| S10 | −1.6406E−01 | 3.3994E−01 | −7.9951E−01 | 1.5383E+00 | −2.2750E+00 | 2.5059E+00 | −2.0417E+00 |
| S11 | −2.6276E−01 | 2.3122E−02 | 4.6985E−01 | −1.1548E+00 | 1.6762E+00 | −1.6795E+00 | 1.2083E+00 |
| S12 | −2.5923E−01 | 1.6888E−01 | 2.3591E−02 | −2.7161E−01 | 4.2828E−01 | −4.0635E−01 | 2.6578E−01 |

TABLE 6-2

| Surface number | A18 | A20 | A22 | A24 | A26 | A28 | A30 |
|---|---|---|---|---|---|---|---|
| S1 | −5.4540E−02 | 1.7711E−02 | −4.0813E−03 | 6.5128E−04 | −6.8386E−05 | 4.2479E−06 | −1.1820E−07 |
| S2 | 3.3675E−01 | −1.0456E−01 | 2.3411E−02 | −3.6765E−03 | 3.8389E−04 | −2.3921E−05 | 6.7270E−07 |
| S3 | 1.8902E−03 | 4.5590E−02 | −2.3918E−02 | 6.5697E−03 | −1.0650E−03 | 9.6457E−05 | −3.7791E−06 |
| S4 | 1.4380E+00 | −5.6647E−01 | 1.5837E−01 | −3.0838E−02 | 4.0007E−03 | −3.1301E−04 | 1.1253E−05 |
| S5 | 5.4069E+00 | −2.6696E+00 | 9.5970E−01 | −2.4445E−01 | 4.1773E−02 | −4.2888E−03 | 1.9961E−04 |
| S6 | 2.0380E+01 | −1.4716E+01 | 8.0167E+00 | −3.1805E+00 | 8.6364E−01 | −1.4287E−01 | 1.0811E−02 |
| S7 | −3.3643E+02 | 3.0847E+02 | −2.0251E+02 | 9.2747E+01 | −2.8127E+01 | 5.0729E+00 | −4.1174E−01 |
| S8 | 7.9409E+02 | −8.4492E+02 | 6.3972E+02 | −3.3627E+02 | 1.1660E+02 | −2.3973E+01 | 2.2131E+00 |
| S9 | 1.4705E+00 | −8.8110E−01 | 3.7544E−01 | −1.1064E−01 | 2.1381E−02 | −2.4327E−03 | 1.2338E−04 |
| S10 | 1.2277E+00 | −5.4176E−01 | 1.7296E−01 | −3.8839E−02 | 5.8169E−03 | −5.2199E−04 | 2.1262E−05 |
| S11 | −6.3204E−01 | 2.4012E−01 | −6.5414E−02 | 1.2427E−02 | −1.5609E−03 | 1.1640E−04 | −3.8999E−06 |
| S12 | −1.2463E−01 | 4.2313E−02 | −1.0323E−02 | 1.7648E−03 | −2.0068E−04 | 1.3632E−05 | −4.1846E−07 |

Figures 6C, 6D:
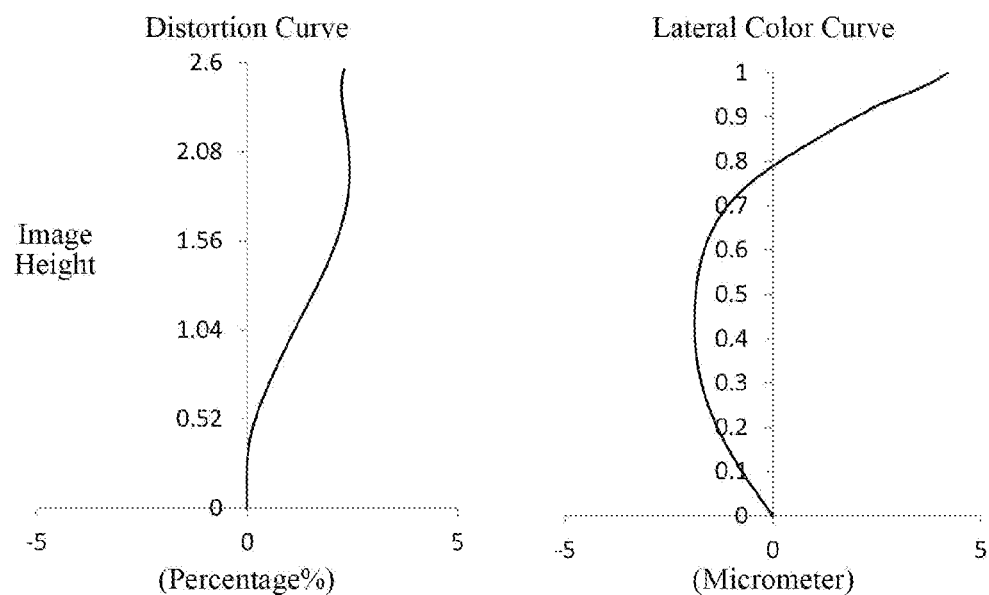

FIG. 6A illustrates longitudinal aberration curves of the camera lens group according to example 3, representing the deviations of focal points converged by light of different wavelengths after passing through the lens group. FIG. 6B illustrates astigmatic curves of the camera lens group according to example 3, representing the curvatures of a tangential plane and the curvatures of a sagittal plane. FIG. 6C illustrates a distortion curve of the camera lens group according to example 3, representing the amounts of distortion corresponding to different image heights. FIG. 6D illustrates a lateral color curve of the camera lens group according to example 3, representing the deviations of different image heights on an imaging plane after light passes through the lens group. It can be seen from FIG. 6A to FIG. 6D that the camera lens group provided in example 3 may achieve good image quality.

Example 4

Figure 7:
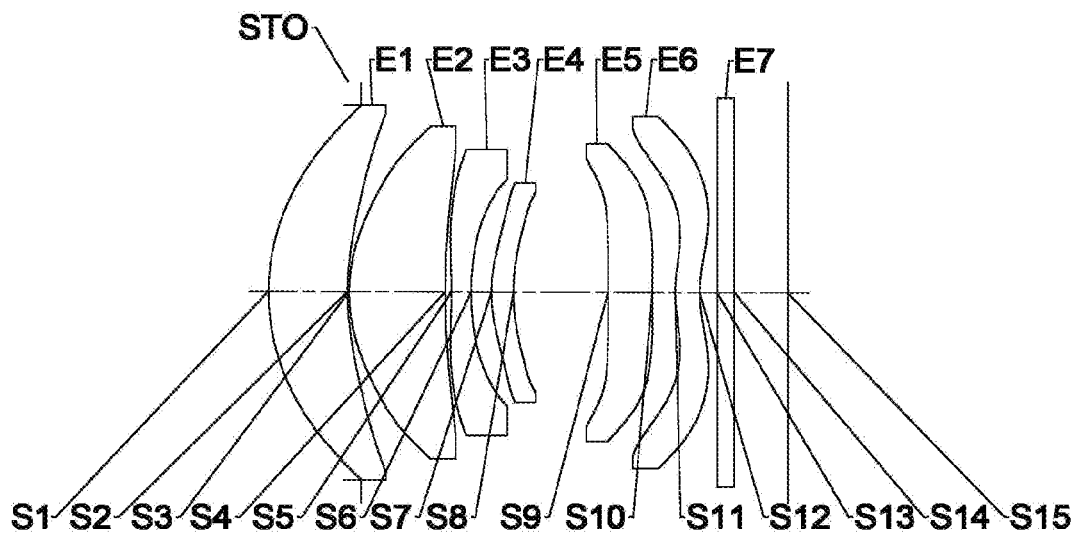
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 5.91 mm, a total length TTL of the camera lens group is 6.38 mm, half of a diagonal length ImgH of an effective pixel area on the imaging plane S15 of the camera lens group is 2.58 mm, half of a maximum field-of-view Semi-FOV of the camera lens group is 23.2°, and an F number Fno of the camera lens group is 1.28.

Table 7 is a table illustrating basic parameters of the camera lens group of example 4, wherein the units for the radius of curvature, the thickness/distance and the focal length are millimeter (mm). Table 8-1 and Table 8-2 show high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1362 | | | | |
| S1 | Aspheric | 2.7142 | 0.9679 | 1.55 | 56.1 | 25.47 | −0.1222 |
| S2 | Aspheric | 2.9477 | 0.0200 | | | | −0.4890 |
| S3 | Aspheric | 1.8267 | 1.1841 | 1.55 | 56.1 | 3.72 | −0.9947 |
| S4 | Aspheric | 13.8431 | 0.0756 | | | | −74.4397 |
| S5 | Aspheric | −9.3618 | 0.2406 | 1.67 | 19.2 | −3.36 | −2.8064 |
| S6 | Aspheric | 3.0423 | 0.2491 | | | | 0.6242 |
| S7 | Aspheric | 1.7675 | 0.2705 | 1.67 | 19.2 | 9.08 | 0.0091 |
| S8 | Aspheric | 2.3272 | 1.1619 | | | | 0.7257 |
| S9 | Aspheric | 24.4592 | 0.5449 | 1.67 | 20.4 | −29.55 | 41.6478 |
| S10 | Aspheric | 10.8122 | 0.2804 | | | | −99.0000 |
| S11 | Aspheric | 1.6576 | 0.3024 | 1.55 | 56.1 | 499.91 | −13.1712 |
| S12 | Aspheric | 1.5602 | 0.2130 | | | | −5.9484 |
| S13 | Spherical | Infinite | 0.2100 | 1.52 | 64.2 | | |
| S14 | Spherical | Infinite | 0.6596 | | | | |
| S15 | Spherical | Infinite | | | | | |

TABLE 8-1

| Surface number | A4 | A6 | A8 | A10 | A12 | A14 | A16 |
|---|---|---|---|---|---|---|---|
| S1 | 4.8040E−03 | −2.1416E−02 | 6.7389E−02 | −1.2695E−01 | 1.5393E−01 | −1.2694E−01 | 7.3529E−02 |
| S2 | −1.4895E−01 | 3.9621E−01 | −8.4089E−01 | 1.2251E+00 | −1.2511E+00 | 9.1768E−01 | −4.9102E−01 |
| S3 | −1.3501E−01 | 3.8415E−01 | −8.0516E−01 | 1.1384E+00 | −1.1064E+00 | 7.4864E−01 | −3.5071E−01 |
| S4 | 4.4622E−03 | 1.8497E−01 | −5.8597E−01 | 9.0655E−01 | −8.0538E−01 | 3.3325E−01 | 1.0438E−01 |
| S5 | −4.3434E−03 | 4.8624E−01 | −1.6354E+00 | 3.4406E+00 | −5.1470E+00 | 5.7015E+00 | −4.7592E+00 |
| S6 | −1.3096E−01 | 7.2101E−01 | −2.6531E+00 | 8.2796E+00 | −2.0976E+01 | 4.1645E+01 | −6.3097E+01 |
| S7 | −1.8433E−01 | 8.6339E−02 | 6.1114E−01 | −4.3990E+00 | 1.5782E+01 | −3.7274E+01 | 6.2071E+01 |
| S8 | −9.5027E−02 | 2.8788E−01 | −2.3550E+00 | 1.3078E+01 | −4.8918E+01 | 1.2697E+02 | −2.3392E+02 |
| S9 | −5.6301E−02 | 4.7891E−02 | 2.4308E−02 | −3.3775E−01 | 8.1594E−01 | −1.1345E+00 | 1.0386E+00 |
| S10 | −2.4370E−01 | 5.7281E−01 | −1.3313E+00 | 2.5128E+00 | −3.6589E+00 | 3.9934E+00 | −3.2383E+00 |
| S11 | −1.8408E−01 | −2.2554E−01 | 1.0067E+00 | −2.0091E+00 | 2.6803E+00 | −2.5489E+00 | 1.7607E+00 |
| S12 | −2.0937E−01 | 3.1326E−02 | 2.9003E−01 | −6.4624E−01 | 8.1239E−01 | −6.9336E−01 | 4.2208E−01 |

TABLE 8-2

| Surface number | A18 | A20 | A22 | A24 | A26 | A28 | A30 |
|---|---|---|---|---|---|---|---|
| S1 | −3.0428E−02 | 9.0352E−03 | −1.9087E−03 | 2.7983E−04 | −2.7046E−05 | 1.5489E−06 | −3.9792E−08 |
| S2 | 1.9294E−01 | −5.5539E−02 | 1.1558E−02 | −1.6908E−03 | 1.6473E−04 | −9.5910E−06 | 2.5229E−07 |
| S3 | 1.0960E−01 | −2.0134E−02 | 9.1766E−04 | 5.1342E−04 | −1.3404E−04 | 1.4223E−05 | −5.9271E−07 |
| S4 | −2.4166E−01 | 1.6613E−01 | −6.6415E−02 | 1.6812E−02 | −2.6613E−03 | 2.4117E−04 | −9.5700E−06 |
| S5 | 3.0091E+00 | −1.4324E+00 | 5.0393E−01 | −1.2659E−01 | 2.1391E−02 | −2.1706E−03 | 9.9652E−05 |
| S6 | 7.1562E+01 | −5.9766E+01 | 3.6034E+01 | −1.5205E+01 | 4.2507E+00 | −7.0626E−01 | 5.2731E−02 |
| S7 | −7.4672E+01 | 6.5185E+01 | −4.0867E+01 | 1.7911E+01 | −5.2033E+00 | 8.9910E−01 | −6.9881E−02 |
| S8 | 3.0996E+02 | −2.9618E+02 | 2.0221E+02 | −9.6170E+01 | 3.0258E+01 | −5.6588E+00 | 4.7614E−01 |

TABLE 8-2-continued

| Surface number | A18 | A20 | A22 | A24 | A26 | A28 | A30 |
|---|---|---|---|---|---|---|---|
| S9 | −6.4603E−01 | 2.7000E−01 | −7.1643E−02 | 1.0121E−02 | −1.3443E−04 | −1.6378E−04 | 1.6282E−05 |
| S10 | 1.9432E+00 | −8.5656E−01 | 2.7307E−01 | −6.1132E−02 | 9.1007E−03 | −8.0805E−04 | 3.2356E−05 |
| S11 | −8.8784E−01 | 3.2559E−01 | −8.5649E−02 | 1.5713E−02 | −1.9059E−03 | 1.3724E−04 | −4.4399E−06 |
| S12 | −1.8654E−01 | 6.0006E−02 | −1.3909E−02 | 2.2633E−03 | −2.4532E−04 | 1.5907E−05 | −4.6675E−07 |

Figure 8A:
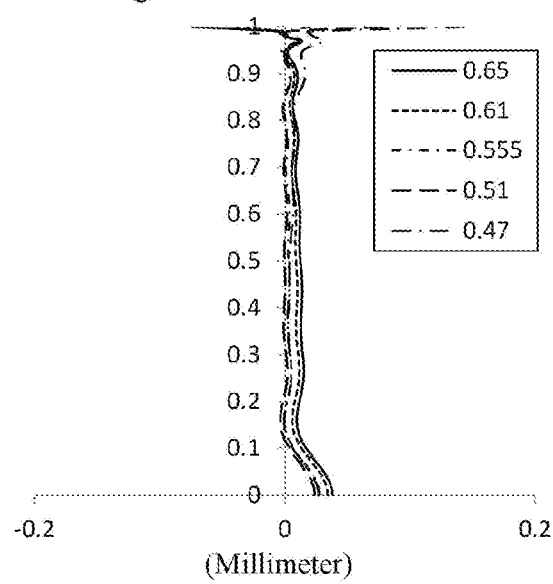
FIGS. 8A to 8D illustrate longitudinal aberration curves, astigmatic curves, a distortion curve, and a lateral color curve of the camera lens group of the example 4, respectively.
Figure 8B:
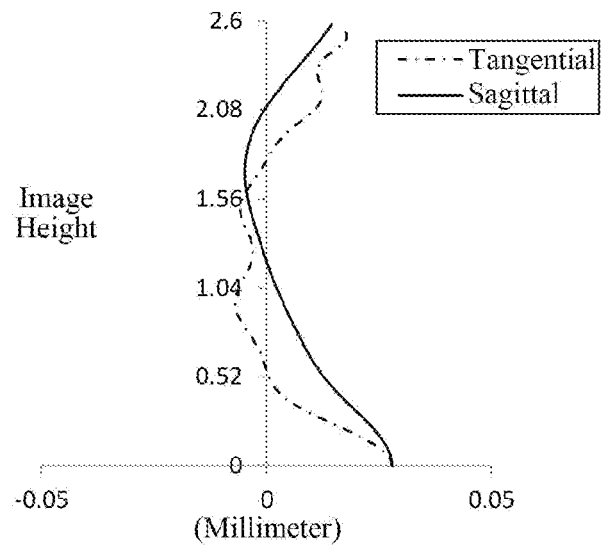
Figure 8C:
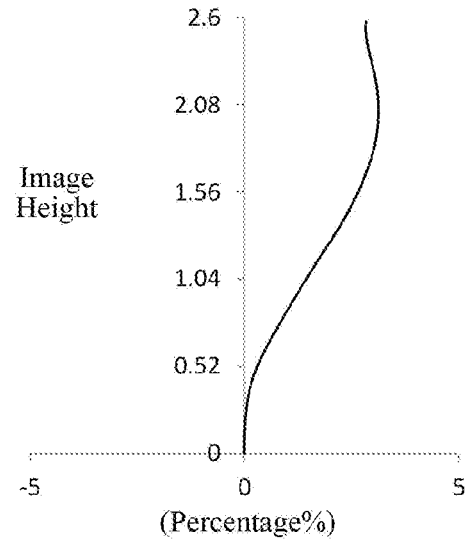
Figure 8D:
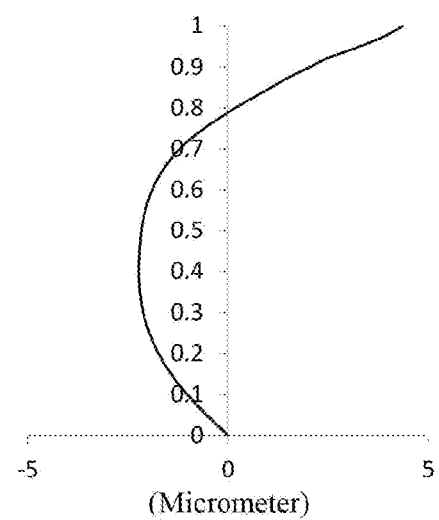

FIG. 8A illustrates longitudinal aberration curves of the camera lens group according to example 4, representing the deviations of focal points converged by light of different wavelengths after passing through the lens group. FIG. 8B illustrates astigmatic curves of the camera lens group according to example 4, representing the curvatures of a tangential plane and the curvatures of a sagittal plane. FIG. 8C illustrates a distortion curve of the camera lens group according to example 4, representing the amounts of distortion corresponding to different image heights. FIG. 8D illustrates a lateral color curve of the camera lens group according to example 4, representing the deviations of different image heights on an imaging plane after light passes through the lens group. It can be seen from FIG. 8A to FIG. 8D that the camera lens group provided in example 4 may achieve good image quality.

Example 5

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 6.00 mm, a total length TTL of the camera lens group is 6.40 mm, half of a diagonal length ImgH of an effective pixel area on the imaging plane S15 of the camera lens group is 2.72 mm, half of a maximum field-of-view Semi-FOV of the camera lens group is 23.9°, and an F number Fno of the camera lens group is 1.31.

Table 9 is a table illustrating basic parameters of the camera lens group of example 5, wherein the units for the radius of curvature, the thickness/distance and the focal length are millimeter (mm). Table 10-1 and Table 10-2 show high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −1.1300 | | | | |
| S1 | Aspheric | 2.6911 | 0.9462 | 1.55 | 56.1 | 26.37 | −0.1245 |
| S2 | Aspheric | 2.8988 | 0.0200 | | | | −0.2941 |
| S3 | Aspheric | 1.8097 | 1.1849 | 1.55 | 56.1 | 3.71 | −0.9822 |
| S4 | Aspheric | 13.0047 | 0.0698 | | | | −75.9059 |
| S5 | Aspheric | −9.2467 | 0.2400 | 1.67 | 19.2 | −3.46 | −5.7494 |
| S6 | Aspheric | 3.1685 | 0.2366 | | | | 0.5807 |
| S7 | Aspheric | 1.8123 | 0.2519 | 1.67 | 19.2 | 10.11 | −0.0292 |
| S8 | Aspheric | 2.3258 | 1.1633 | | | | 0.7850 |
| S9 | Aspheric | −128.2001 | 0.5295 | 1.67 | 20.4 | −152.56 | −99.0000 |
| S10 | Aspheric | 492.2046 | 0.3011 | | | | 99.0000 |
| S11 | Aspheric | 1.7626 | 0.3000 | 1.55 | 56.1 | −40.73 | −14.1928 |
| S12 | Aspheric | 1.5350 | 0.2501 | | | | −1.0000 |
| S13 | Spherical | Infinite | 0.2100 | 1.52 | 64.2 | | |
| S14 | Spherical | Infinite | 0.6966 | | | | |
| S15 | Spherical | Infinite | | | | | |

TABLE 10-1

| Surface number | A4 | A6 | A8 | A10 | A12 | A14 | A16 |
|---|---|---|---|---|---|---|---|
| S1  | 4.5486E−03 | −1.8741E−02 | 5.8852E−02 | −1.1239E−01 | 1.3841E−01 | −1.1582E−01 | 6.7978E−02 |
| S2  | −1.3421E−01 | 3.0930E−01 | −6.2700E−01 | 9.0290E−01 | −9.2285E−01 | 6.8030E−01 | −3.6637E−01 |
| S3  | −1.1918E−01 | 2.9830E−01 | −5.9470E−01 | 8.2510E−01 | −7.9516E−01 | 5.3580E−01 | −2.5177E−01 |
| S4  | 1.1562E−02 | 1.8071E−01 | −9.1519E−01 | 2.6223E+00 | −4.9174E+00 | 6.1932E+00 | −5.3719E+00 |
| S5  | 1.2797E−02 | 3.5854E−01 | −1.3172E+00 | 3.2015E+00 | −5.4380E+00 | 6.4136E+00 | −5.2773E+00 |
| S6  | −1.1032E−01 | 5.0763E−01 | −1.4307E+00 | 3.3945E+00 | −6.3693E+00 | 9.1289E+00 | −9.9782E+00 |
| S7  | −1.6551E−01 | −1.3690E−01 | 2.0712E+00 | −1.0930E+01 | 3.6136E+01 | −8.2043E+01 | 1.3250E+02 |
| S8  | −7.2333E−02 | 2.0327E−02 | −3.8865E−01 | 3.1727E+00 | −1.4165E+01 | 4.0328E+01 | −7.7792E+01 |
| S9  | −3.5644E−02 | −6.6791E−02 | 6.2210E−01 | −2.4268E+00 | 5.7129E+00 | −9.0310E+00 | 1.0013E+01 |
| S10 | −2.1074E−01 | 4.6303E−01 | −1.0384E+00 | 1.9305E+00 | −2.8623E+00 | 3.2902E+00 | −2.8825E+00 |
| S11 | −2.0621E−01 | −1.3115E−01 | 8.4246E−01 | −1.8640E+00 | 2.6429E+00 | −2.6077E+00 | 1.8421E+00 |
| S12 | −4.0000E−01 | 3.0917E−01 | −1.3055E−01 | −1.3097E−01 | 3.2822E−01 | −3.4650E−01 | 2.3269E−01 |

TABLE 10-2

| Surface number | A18 | A20 | A22 | A24 | A26 | A28 | A30 |
|---|---|---|---|---|---|---|---|
| S1  | −2.8471E−02 | 8.5504E−03 | −1.8267E−03 | 2.7089E−04 | −2.6498E−05 | 1.5370E−06 | −4.0034E−08 |
| S2  | 1.4503E−01 | −4.2105E−02 | 8.8507E−03 | −1.3100E−03 | 1.2939E−04 | −7.6524E−06 | 2.0489E−07 |
| S3  | 8.0662E−02 | −1.6413E−02 | 1.6211E−03 | 8.9989E−05 | −4.7905E−05 | 5.5475E−06 | −2.3242E−07 |
| S4  | 3.2747E+00 | −1.4166E+00 | 4.3316E−01 | −9.1637E−02 | 1.2771E−02 | −1.0554E−03 | 3.9195E−05 |
| S5  | 3.0482E+00 | −1.2336E+00 | 3.4400E−01 | −6.3488E−02 | 7.1269E−03 | −4.0087E−04 | 5.7332E−06 |
| S6  | 8.3904E+00 | −5.4547E+00 | 2.7121E+00 | −9.9475E−01 | 2.5107E−01 | −3.8382E−02 | 2.6356E−03 |
| S7  | −1.5458E+02 | 1.3057E+02 | −7.9046E+01 | 3.3413E+01 | −9.3582E+00 | 1.5595E+00 | −1.1700E−01 |
| S8  | 1.0469E+02 | −9.9333E+01 | 6.6095E+01 | −3.0135E+01 | 8.9481E+00 | −1.5550E+00 | 1.1960E−01 |
| S9  | −7.9400E+00 | 4.5251E+00 | −1.8377E+00 | 5.1865E−01 | −9.6622E−02 | 1.0677E−02 | −5.2974E−04 |
| S10 | 1.8990E+00 | −9.2713E−01 | 3.2866E−01 | −8.1901E−02 | 1.3564E−02 | −1.3377E−03 | 5.9368E−05 |
| S11 | −9.4255E−01 | 3.4963E−01 | −9.3009E−02 | 1.7282E−02 | −2.1283E−03 | 1.5602E−04 | −5.1511E−06 |
| S12 | −1.0806E−01 | 3.5588E−02 | −8.3126E−03 | 1.3487E−03 | −1.4468E−04 | 9.2351E−06 | −2.6571E−07 |

FIG. 10A illustrates longitudinal aberration curves of the camera lens group according to example 5, representing the deviations of focal points converged by light of different wavelengths after passing through the lens group. FIG. 10B illustrates astigmatic curves of the camera lens group according to example 5, representing the curvatures of a tangential plane and the curvatures of a sagittal plane. FIG. 10C illustrates a distortion curve of the camera lens group according to example 5, representing the amounts of distortion corresponding to different image heights. FIG. 10D illustrates a lateral color curve of the camera lens group according to example 5, representing the deviations of different image heights on an imaging plane after light passes through the lens group. It can be seen from FIG. 10A to FIG. 10D that the camera lens group provided in example 5 may achieve good image quality.

Example 6

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 6.00 mm, a total length TTL of the camera lens group is 6.50 mm, half of a diagonal length ImgH of an effective pixel area on the imaging plane S15 of the camera lens group is 2.72 mm, half of a maximum field-of-view Semi-FOV of the camera lens group is 23.9°, and an F number Fno of the camera lens group is 1.31.

Table 11 is a table illustrating basic parameters of the camera lens group of example 6, wherein the units for the radius of curvature, the thickness/distance and the focal length are millimeter (mm). Table 12-1 and Table 12-2 show high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.1233 | | | | |
| S1 | Aspheric | 2.7000 | 0.9218 | 1.55 | 56.1 | 35.00 | −0.1252 |
| S2 | Aspheric | 2.7652 | 0.0269 | | | | −0.4162 |
| S3 | Aspheric | 1.7805 | 1.1987 | 1.55 | 56.1 | 3.64 | −0.9967 |
| S4 | Aspheric | 13.0169 | 0.0781 | | | | −74.2506 |
| S5 | Aspheric | −9.0955 | 0.2400 | 1.67 | 19.2 | −3.47 | −5.0349 |
| S6 | Aspheric | 3.2049 | 0.2296 | | | | 0.6089 |
| S7 | Aspheric | 1.8386 | 0.2670 | 1.67 | 19.2 | 9.97 | −0.0338 |
| S8 | Aspheric | 2.3778 | 1.1576 | | | | 0.7299 |
| S9 | Aspheric | −126.3140 | 0.5493 | 1.67 | 20.4 | 838.15 | 94.4995 |
| S10 | Aspheric | −103.1972 | 0.3063 | | | | −99.0000 |
| S11 | Aspheric | 1.7899 | 0.3101 | 1.55 | 56.1 | −47.27 | −13.3042 |
| S12 | Aspheric | 1.5714 | 0.2784 | | | | −1.0000 |
| S13 | Spherical | Infinite | 0.2100 | 1.52 | 64.2 | | |
| S14 | Spherical | Infinite | 0.7249 | | | | |
| S15 | Spherical | Infinite | | | | | |

TABLE 12-1

| Surface number | A4 | A6 | A8 | A10 | A12 | A14 | A16 |
|---|---|---|---|---|---|---|---|
| S1 | 2.2940E−03 | −7.2186E−03 | 2.6150E−02 | −5.5658E−02 | 7.3568E−02 | −6.4675E−02 | 3.9341E−02 |
| S2 | −1.3415E−01 | 2.9153E−01 | −5.6773E−01 | 7.9773E−01 | −8.0230E−01 | 5.8406E−01 | −3.1097E−01 |
| S3 | −1.2274E−01 | 3.0482E−01 | −6.2428E−01 | 9.2401E−01 | −9.8425E−01 | 7.6362E−01 | −4.3682E−01 |
| S4 | 1.8852E−02 | 6.6147E−02 | −3.2057E−01 | 9.7434E−01 | −2.0695E+00 | 2.8907E+00 | −2.6968E+00 |
| S5 | 1.6507E−02 | 3.0724E−01 | −1.0284E+00 | 2.3846E+00 | −4.1046E+00 | 5.0782E+00 | −4.4669E+00 |
| S6 | −9.7501E−02 | 3.3225E−01 | −9.8449E−02 | −2.7607E+00 | 1.2329E+01 | −3.0255E+01 | 4.9262E+01 |
| S7 | −1.7702E−01 | 1.4502E−02 | 8.9790E−01 | −5.3301E+00 | 1.8475E+01 | −4.3458E+01 | 7.2360E+01 |
| S8 | −5.9796E−02 | −2.0759E−01 | 1.7526E+00 | −8.9994E+00 | 3.1233E+01 | −7.6051E+01 | 1.3304E+02 |
| S9 | −5.2774E−02 | 9.5478E−02 | −1.9416E−01 | 1.2081E−01 | 4.0627E−01 | −1.3248E+00 | 2.0117E+00 |
| S10 | −2.1257E−01 | 4.9145E−01 | −1.1728E+00 | 2.2540E+00 | −3.3338E+00 | 3.7319E+00 | −3.1477E+00 |
| S11 | −2.2728E−01 | 5.6575E−02 | 1.7048E−01 | −4.5423E−01 | 6.9463E−01 | −7.3778E−01 | 5.6088E−01 |
| S12 | −3.7179E−01 | 2.9665E−01 | −2.1002E−01 | 8.7283E−02 | 3.0028E−02 | −8.5576E−02 | 7.5104E−02 |

TABLE 12-2

| Surface number | A18 | A20 | A22 | A24 | A26 | A28 | A30 |
|---|---|---|---|---|---|---|---|
| S1 | −1.6922E−02 | 5.1865E−03 | −1.1256E−03 | 1.6901E−04 | −1.6698E−05 | 9.7643E−07 | −2.5601E−08 |
| S2 | 1.2171E−01 | −3.4932E−02 | 7.2571E−03 | −1.0614E−03 | 1.0359E−04 | −6.0546E−06 | 1.6023E−07 |
| S3 | 1.8567E−01 | −5.8639E−02 | 1.3615E−02 | −2.2643E−03 | 2.5599E−04 | −1.7661E−05 | 5.6201E−07 |
| S4 | 1.7291E+00 | −7.7528E−01 | 2.4341E−01 | −5.2550E−02 | 7.4428E−03 | −6.2336E−04 | 2.3417E−05 |
| S5 | 2.8022E+00 | −1.2560E+00 | 3.9915E−01 | −8.7810E−02 | 1.2711E−02 | −1.0883E−03 | 4.1706E−05 |
| S6 | −5.6128E+01 | 4.5504E+01 | −2.6175E+01 | 1.0453E+01 | −2.7591E+00 | 4.3336E−01 | −3.0711E−02 |
| S7 | −8.6650E+01 | 7.4799E+01 | −4.6085E+01 | 1.9750E+01 | −5.5896E+00 | 9.3864E−01 | −7.0794E−02 |
| S8 | −1.6915E+02 | 1.5649E+02 | −1.0422E+02 | 4.8659E+01 | −1.5108E+01 | 2.8004E+00 | −2.3437E−01 |
| S9 | −1.9256E+00 | 1.2469E+00 | −5.5524E−01 | 1.6781E−01 | −3.2903E−02 | 3.7753E−03 | −1.9232E−04 |
| S10 | 1.9917E+00 | −9.3663E−01 | 3.2153E−01 | −7.8061E−02 | 1.2668E−02 | −1.2305E−03 | 5.4008E−05 |
| S11 | −3.0773E−01 | 1.2173E−01 | −3.4334E−02 | 6.7245E−03 | −8.6815E−04 | 6.6374E−05 | −2.2748E−06 |
| S12 | −4.0292E−02 | 1.4624E−02 | −3.6726E−03 | 6.3070E−04 | −7.0838E−05 | 4.6951E−06 | −1.3938E−07 |

Figure 12A:
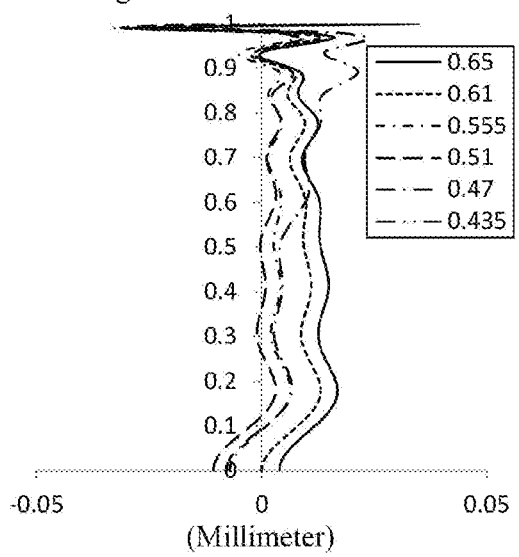
FIGS. 12A to 12D illustrate longitudinal aberration curves, astigmatic curves, a distortion curve, and a lateral color curve of the camera lens group of the example 6, respectively.
Figure 12B:
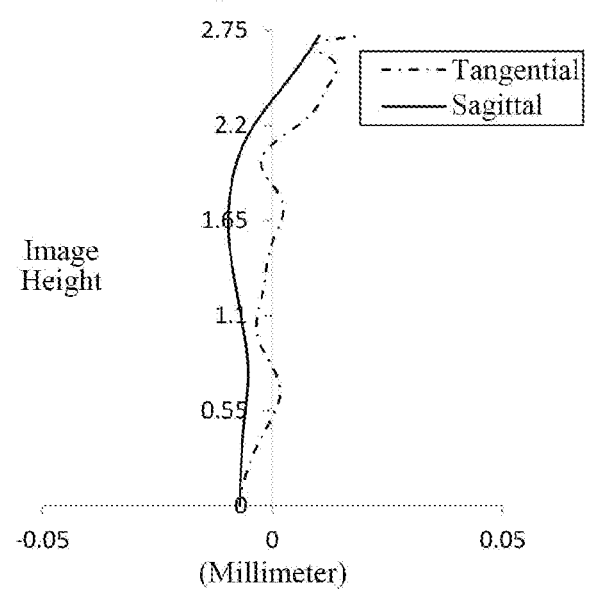
Figure 12C:
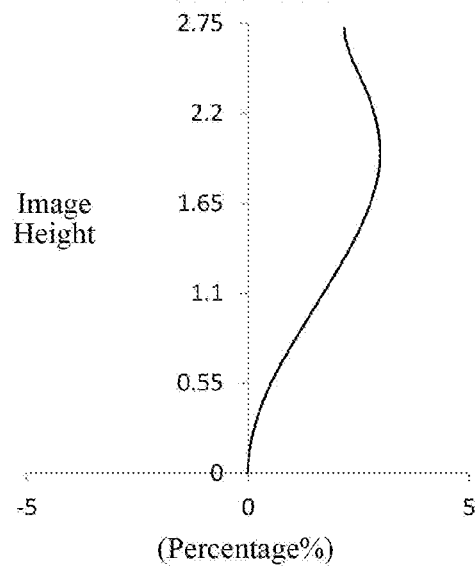
Figure 12D:
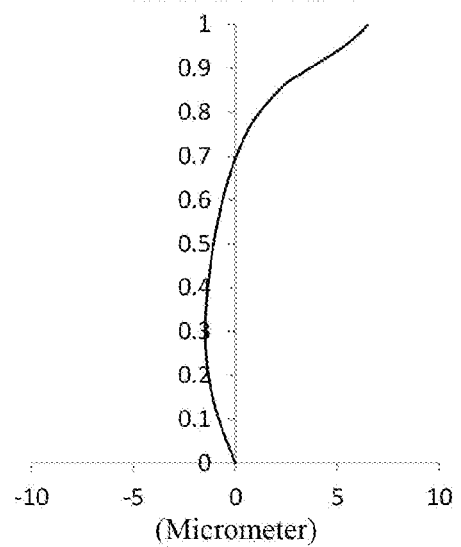

FIG. 12A illustrates longitudinal aberration curves of the camera lens group according to example 6, representing the deviations of focal points converged by light of different wavelengths after passing through the lens group. FIG. 12B illustrates astigmatic curves of the camera lens group according to example 6, representing the curvatures of a tangential plane and the curvatures of a sagittal plane. FIG. 12C illustrates a distortion curve of the camera lens group according to example 6, representing the amounts of distortion corresponding to different image heights. FIG. 12D illustrates a lateral color curve of the camera lens group according to example 6, representing the deviations of different image heights on an imaging plane after light passes through the lens group. It can be seen from FIG. 12A to FIG. 12D that the camera lens group provided in example 6 may achieve good image quality.

Example 7

Figure 13:
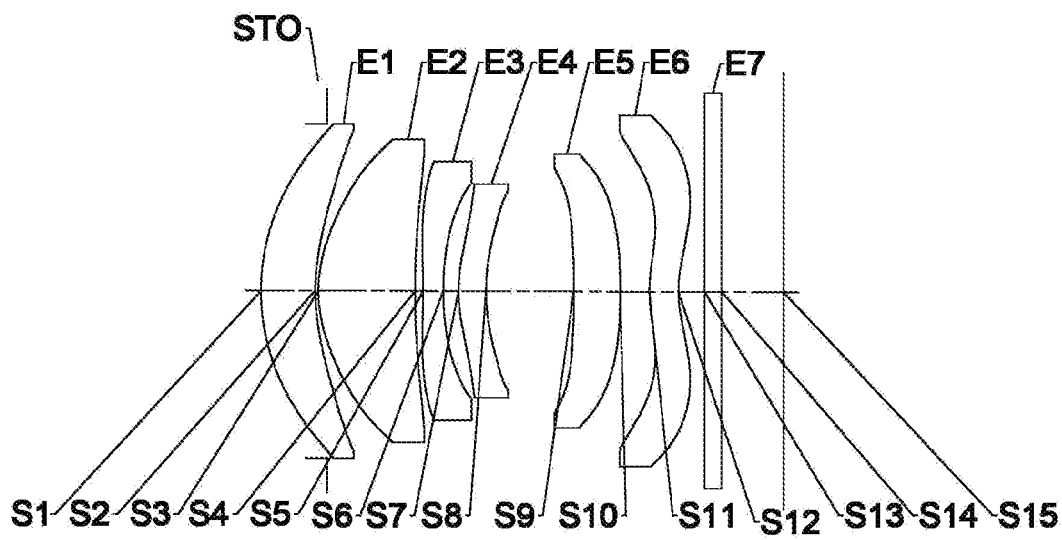
FIG. 13 illustrates a schematic structural view of a camera lens group according to example 7 of the present disclosure.

A camera lens group according to example 7 of the present disclosure is described below with reference to FIG. 13 to FIG. 14D. FIG. 13 shows a schematic structural view of the camera lens group according to example 7 of the present disclosure.

As shown in FIG. 13, the camera lens group includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. Light from an object sequentially passes through the respective surfaces S1 to S14 and is finally imaged on the imaging plane S15.

In this example, a total effective focal length f of the camera lens group is 6.02 mm, a total length TTL of the camera lens group is 6.50 mm, half of a diagonal length ImgH of an effective pixel area on the imaging plane S15 of the camera lens group is 2.72 mm, half of a maximum field-of-view Semi-FOV of the camera lens group is 23.9°, and an F number Fno of the camera lens group is 1.45.

Table 13 is a table illustrating basic parameters of the camera lens group of example 7, wherein the units for the radius of curvature, the thickness/distance and the focal length are millimeter (mm). Table 14-1 and Table 14-2 show high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8224 | | | | |
| S1 | Aspheric | 2.6985 | 0.6740 | 1.55 | 56.1 | −349.09 | −0.1483 |
| S2 | Aspheric | 2.4261 | 0.0401 | | | | −0.8144 |
| S3 | Aspheric | 1.6613 | 1.2025 | 1.55 | 56.1 | 3.34 | −1.0087 |
| S4 | Aspheric | 13.9097 | 0.1020 | | | | −94.5490 |
| S5 | Aspheric | −8.7228 | 0.2489 | 1.67 | 19.2 | −3.58 | −8.6138 |
| S6 | Aspheric | 3.3995 | 0.1886 | | | | 0.5171 |
| S7 | Aspheric | 1.9017 | 0.3422 | 1.67 | 19.2 | 11.50 | −0.0459 |
| S8 | Aspheric | 2.3332 | 1.0917 | | | | 0.6613 |
| S9 | Aspheric | −27.3452 | 0.5760 | 1.67 | 20.4 | 55.13 | −92.6064 |
| S10 | Aspheric | −15.8092 | 0.3637 | | | | −99.0000 |
| S11 | Aspheric | 1.7600 | 0.3611 | 1.55 | 56.1 | −49.64 | −9.0969 |
| S12 | Aspheric | 1.5330 | 0.3263 | | | | −1.0000 |
| S13 | Spherical | Infinite | 0.2100 | 1.52 | 64.2 | | |
| S14 | Spherical | Infinite | 0.7728 | | | | |
| S15 | Spherical | Infinite | | | | | |

TABLE 14-1

| Surface number | A4 | A6 | A8 | A10 | A12 | A14 | A16 |
|---|---|---|---|---|---|---|---|
| S1 | 3.6319E−03 | −1.4295E−02 | 6.0410E−02 | −1.4549E−01 | 2.1899E−01 | −2.2207E−01 | 1.5775E−01 |
| S2 | −1.3543E−01 | 2.9200E−01 | −5.9627E−01 | 9.0025E−01 | −9.9658E−01 | 8.1503E−01 | −4.9467E−01 |
| S3 | −1.2047E−01 | 2.7128E−01 | −5.2720E−01 | 7.3980E−01 | −7.3068E−01 | 4.9568E−01 | −2.1502E−01 |
| S4 | −1.3908E−02 | 2.2776E−01 | −6.9759E−01 | 1.3852E+00 | −2.1547E+00 | 2.6129E+00 | −2.3685E+00 |
| S5 | −7.3116E−03 | 5.2257E−01 | −1.7019E+00 | 3.5105E+00 | −5.2754E+00 | 5.9355E+00 | −4.9900E+00 |
| S6 | −1.3940E−01 | 7.5835E−01 | −2.2949E+00 | 5.0903E+00 | −8.3581E+00 | 9.9014E+00 | −7.8507E+00 |
| S7 | −2.1573E−01 | 2.3776E−01 | −2.0856E−02 | −2.0641E+00 | 8.9164E+00 | −2.1943E+01 | 3.6418E+01 |

TABLE 14-1-continued

| Surface number | A4 | A6 | A8 | A10 | A12 | A14 | A16 |
|---|---|---|---|---|---|---|---|
| S8 | −8.8297E−02 | 1.4118E−01 | −1.0042E+00 | 5.7034E+00 | −2.2253E+01 | 6.0313E+01 | −1.1590E+02 |
| S9 | −5.1969E−02 | 1.1014E−01 | −3.6685E−01 | 9.7599E−01 | −2.0231E+00 | 3.1433E+00 | −3.6162E+00 |
| S10 | −1.7430E−01 | 3.3556E−01 | −7.4980E−01 | 1.4606E+00 | −2.2404E+00 | 2.5899E+00 | −2.2286E+00 |
| S11 | −1.9002E−01 | 4.5903E−02 | 4.3410E−02 | −3.9276E−02 | −2.4448E−02 | 7.6370E−02 | −7.9153E−02 |
| S12 | −2.9063E−01 | 1.4950E−01 | −2.6397E−02 | −6.1588E−02 | 9.1309E−02 | −7.3709E−02 | 4.0838E−02 |

TABLE 14-2

| Surface number | A18 | A20 | A22 | A24 | A26 | A28 | A30 |
|---|---|---|---|---|---|---|---|
| S1 | −8.0057E−02 | 2.9188E−02 | −7.5863E−03 | 1.3715E−03 | −1.6388E−04 | 1.1631E−05 | −3.7126E−07 |
| S2 | 2.2287E−01 | −7.4097E−02 | 1.7902E−02 | −3.0514E−03 | 3.4731E−04 | −2.3658E−05 | 7.2860E−07 |
| S3 | 4.4278E−02 | 8.7310E−03 | −9.6373E−03 | 3.3374E−03 | −6.3368E−04 | 6.5866E−05 | −2.9451E−06 |
| S4 | 1.5663E+00 | −7.4682E−01 | 2.5347E−01 | −5.9765E−02 | 9.3221E−03 | −8.6701E−04 | 3.6503E−05 |
| S5 | 3.1083E+00 | −1.4192E+00 | 4.6759E−01 | −1.0820E−01 | 1.6727E−02 | −1.5579E−03 | 6.6476E−05 |
| S6 | 3.1489E+00 | 9.2360E−01 | −2.2447E+00 | 1.5533E+00 | −5.9036E−01 | 1.2370E−01 | −1.1222E−02 |
| S7 | −4.2730E+01 | 3.5912E+01 | −2.1501E+01 | 8.9581E+00 | −2.4697E+00 | 4.0534E−01 | −3.0012E−02 |
| S8 | 1.6005E+02 | −1.5932E+02 | 1.1325E+02 | −5.6038E+01 | 1.8325E+01 | −3.5578E+00 | 3.1036E−01 |
| S9 | 3.0631E+00 | −1.8955E+00 | 8.4379E−01 | −2.6245E−01 | 5.4027E−02 | −6.6026E−03 | 3.6210E−04 |
| S10 | 1.4207E+00 | −6.6617E−01 | 2.2633E−01 | −5.4128E−02 | 8.6346E−03 | −8.2447E−04 | 3.5646E−05 |
| S11 | 5.0228E−02 | −2.1631E−02 | 6.4683E−03 | −1.3263E−03 | 1.7809E−04 | −1.4110E−05 | 4.9991E−07 |
| S12 | −1.6352E−02 | 4.7845E−03 | −1.0144E−03 | 1.5174E−04 | −1.5177E−05 | 9.0982E−07 | −2.4684E−08 |

Figure 14A:
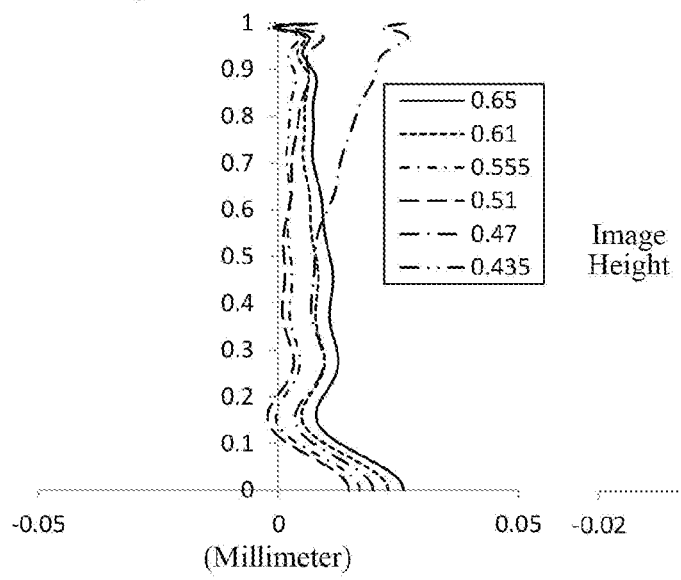
FIGS. 14A to 14D illustrate longitudinal aberration curves, astigmatic curves, a distortion curve, and a lateral color curve of the camera lens group of the example 7, respectively.
Figure 14B:
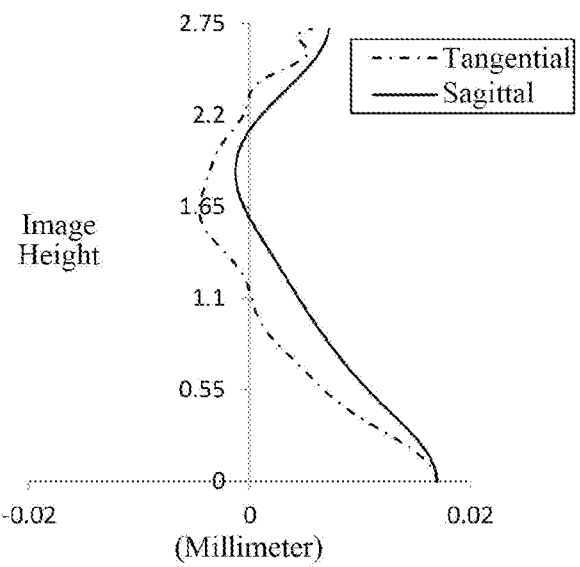
Figure 14C:
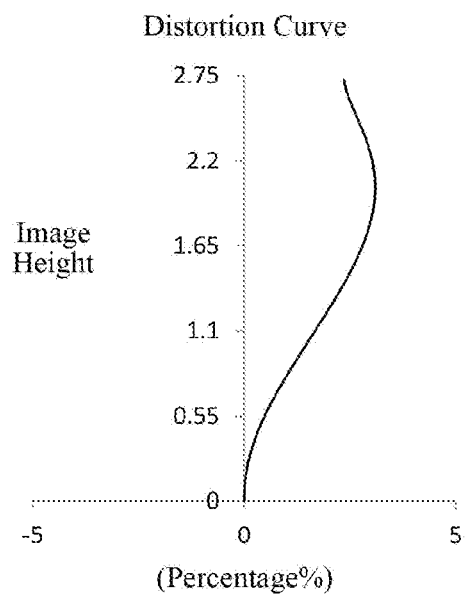
Figure 14D:
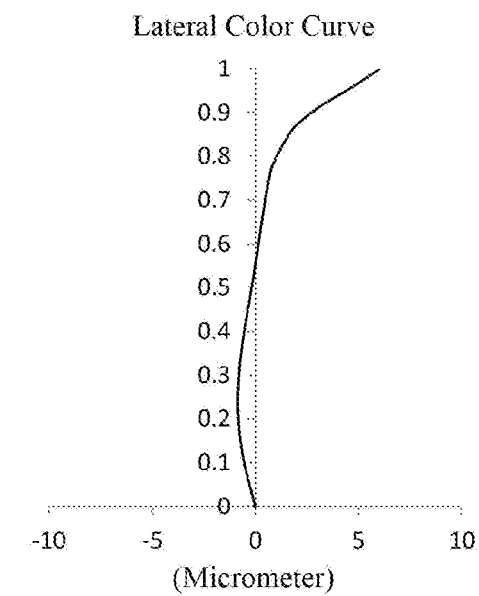

FIG. 14A illustrates longitudinal aberration curves of the camera lens group according to example 7, representing the deviations of focal points converged by light of different wavelengths after passing through the lens group. FIG. 14B illustrates astigmatic curves of the camera lens group according to example 7, representing the curvatures of a tangential plane and the curvatures of a sagittal plane. FIG. 14C illustrates a distortion curve of the camera lens group according to example 7, representing the amounts of distortion corresponding to different image heights. FIG. 14D illustrates a lateral color curve of the camera lens group according to example 7, representing the deviations of different image heights on an imaging plane after light passes through the lens group. It can be seen from FIG. 14A to FIG. 14D that the camera lens group provided in example 7 may achieve good image quality.

In view of the above, examples 1 to 7 respectively satisfy the relationship shown in Table 15.

TABLE 15

| | Example | | | | | | |
|---|---|---|---|---|---|---|---|
| Condition | 1 | 2 | 3 | 4 | 5 | 6 | 7 |
| Fno | 1.33 | 1.39 | 1.32 | 1.28 | 1.31 | 1.31 | 1.45 |
| f23/f | 2.72 | 1.93 | 2.74 | 3.15 | 2.75 | 2.40 | 1.52 |
| f4/R12 | 4.72 | 2.69 | 5.66 | 5.82 | 6.59 | 6.35 | 7.50 |
| f45/BFL | 9.36 | 8.27 | 8.57 | 10.87 | 9.25 | 8.16 | 7.58 |
| R4/R3 | 8.97 | 7.28 | 7.72 | 7.58 | 7.19 | 7.31 | 8.37 |
| (R7 + R8)/(R8 − R7) | 8.93 | 9.58 | 8.73 | 7.32 | 8.06 | 7.82 | 9.82 |
| CT2/T23 | 16.37 | 12.43 | 16.42 | 15.65 | 16.97 | 15.34 | 11.79 |
| T45/CT6 | 3.40 | 5.07 | 3.87 | 3.84 | 3.88 | 3.73 | 3.02 |
| (SAG11 + SAG12)/(SAG11 − SAG12) | 2.60 | 2.94 | 2.58 | 2.41 | 2.47 | 2.58 | 3.26 |
| (ET3 + ET4)/(ET3 − ET4) | 3.91 | 3.04 | 3.07 | 3.18 | 3.29 | 3.44 | 4.83 |
| (DT11 + DT12)/(DT11 − DT12) | 48.03 | 60.41 | 52.28 | 47.72 | 48.48 | 48.11 | 55.42 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
    a first lens having refractive power, a convex object-side surface and a concave image-side surface;
    a second lens having positive refractive power, a convex object-side surface and a concave image-side surface;
    a third lens having negative refractive power, a concave object-side surface and a concave image-side surface;
    a fourth lens having positive refractive power, a convex object-side surface and a concave image-side surface;
    a fifth lens having refractive power; and
    a sixth lens having refractive power, a convex object-side surface and a concave image-side surface,
    wherein Fno≤1.45,
    where Fno is an F number of the camera lens group.

2. The camera lens group according to claim 1, wherein 1.00<f23/f<3.50,
    where f23 is a combined focal length of the second lens and the third lens, and f is a total effective focal length of the camera lens group.

3. The camera lens group according to claim 1, wherein 2.00<f4/R12<8.00,
    where f4 is an effective focal length of the fourth lens, and R12 is a radius of curvature of the image-side surface of the sixth lens.

4. The camera lens group according to claim 1, wherein 7.00<f45/BFL<11.00,
    where f45 is a combined focal length of the fourth lens and the fifth lens, and BFL is a distance from the image-side surface of the sixth lens to an imaging plane of the camera lens group along the optical axis.

5. The camera lens group according to claim 1, wherein 7.00<R4/R3<9.00,
    where R3 is a radius of curvature of the object-side surface of the second lens, and R4 is a radius of curvature of the image-side surface of the second lens.

6. The camera lens group according to claim 1, wherein 7.00<(R7+R8)/(R8−R7)<10.00,
    where R7 is a radius of curvature of the object-side surface of the fourth lens, and R8 is a radius of curvature of the image-side surface of the fourth lens.

7. The camera lens group according to claim 1, wherein 11.00<CT2/T23<17.00,
    where CT2 is a center thickness of the second lens along the optical axis, and T23 is a spaced interval between the second lens and the third lens along the optical axis.

8. The camera lens group according to claim 1, wherein 3.00<T45/CT6<6.00,
    where CT6 is a center thickness of the sixth lens along the optical axis, and T45 is a spaced interval between the fourth lens and the fifth lens along the optical axis.

9. The camera lens group according to claim 1, wherein 2.00<(SAG11+SAG12)/(SAG11−SAG12)<4.00,
    where SAG11 is a distance along the optical axis from an intersection of the object-side surface of the first lens and the optical axis to a vertex of an effective radius of the object-side surface of the first lens, and SAG12 is a distance along the optical axis from an intersection of the image-side surface of the first lens and the optical axis to a vertex of an effective radius of the image-side surface of the first lens.

10. The camera lens group according to claim 1, wherein 3.00<(ET3+ET4)/(ET3−ET4)<5.00,
    where ET3 is an edge thickness of the third lens, and ET4 is an edge thickness of the fourth lens.

11. The camera lens group according to claim 1, wherein 47.00<(DT11+DT12)/(DT11−DT12)<61.00,
    where DT11 is a maximum effective radius of the object-side surface of the first lens, and DT12 is a maximum effective radius of the image-side surface of the first lens.

12. The camera lens group according to claim 1, wherein the camera lens group further comprises a stop disposed between the object side and the first lens.

* * * * *